US012673785B2

(12) United States Patent
Balasubramanian et al.

(10) Patent No.: US 12,673,785 B2
(45) Date of Patent: Jul. 7, 2026

(54) PROGNOSTIC HEALTH MONITOR FOR AIRCRAFT-BASED ANALOG ANGLE OF ATTACK (AOA) SENSORS

(71) Applicant: Rosemount Aerospace Inc., Burnsville, MN (US)

(72) Inventors: Rameshkumar Balasubramanian, Apple Valley, MN (US); Cal C. Roeske, Eagan, MN (US); Michael W. Madsen, Spring Park, MN (US); Richard A Schwartz, Faribault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 18/672,448

(22) Filed: May 23, 2024

(65) Prior Publication Data

US 2025/0361024 A1 Nov. 27, 2025

(51) Int. Cl.
*B64D 45/00* (2006.01)
*B64D 43/02* (2006.01)

(52) U.S. Cl.
CPC ............. *B64D 45/00* (2013.01); *B64D 43/02* (2013.01); *B64D 2045/0085* (2013.01)

(58) Field of Classification Search
CPC . B64D 45/00; B64D 43/02; B64D 2045/0085
See application file for complete search history.

(56) References Cited

U.S. PATENT DOCUMENTS

| | | | |
|---|---|---|---|
| 7,257,470 B2 | 8/2007 | Hongerholt et al. | |
| 9,849,999 B1 * | 12/2017 | Fymat ................... | B64D 45/00 |
| 9,933,451 B2 | 4/2018 | Dupont De Dinechin | |
| 10,725,065 B2 | 7/2020 | Krueger et al. | |
| 11,029,706 B2 | 6/2021 | Li et al. | |
| 11,385,632 B2 | 7/2022 | Whitehead et al. | |
| 11,472,568 B2 | 10/2022 | Schwartz et al. | |
| 11,548,662 B2 | 1/2023 | Galli | |
| 11,593,927 B2 | 2/2023 | Roeske et al. | |
| 11,802,888 B2 | 10/2023 | Naslund et al. | |

(Continued)

FOREIGN PATENT DOCUMENTS

WO 2021042030 A1 3/2021

*Primary Examiner* — Donald J Wallace
*Assistant Examiner* — Jalal C Coduroglu
(74) *Attorney, Agent, or Firm* — Suiter Swantz IP

(57) ABSTRACT

A device or system for prognostic health monitoring (PHM) of aircraft-based analog angle of attack (AoA) sensors includes a data coordinator for sampling AoA data collected by one or more AoA sensors. The data coordinator concurrently samples sensor health data from a suite of monitoring sensors within each AoA sensor (e.g., orientation, voltage, current, temperature). Based on the analog AoA data and sensor health data, the data coordinator determines a sensor responsiveness factor (RF) for each reporting analog AoA sensor. Current RF data is compared to historical RF data to determine a trending responsiveness factor for each analog AoA sensor. If the responsiveness factor for any AoA sensor trends beyond a threshold level, the data coordinator generates an alert for preventive maintenance personal on the ground, the alert indicative of one or more specific fault conditions in that AoA sensor depending on the responsiveness threshold breached.

19 Claims, 21 Drawing Sheets

(56)  References Cited

U.S. PATENT DOCUMENTS

| | | | |
|---|---|---|---|
| 2010/0161274 A1* | 6/2010 | Leao | G05B 23/0243 |
| | | | 702/182 |
| 2015/0274315 A1* | 10/2015 | Conrad | B64D 45/00 |
| | | | 701/31.9 |
| 2018/0136249 A1* | 5/2018 | Krueger | G01P 13/025 |
| 2018/0217585 A1* | 8/2018 | Giering | G05B 23/0254 |
| 2018/0341794 A1* | 11/2018 | Balasubramanian | |
| | | | G06K 7/0008 |
| 2019/0092492 A1* | 3/2019 | Harrington | B64C 9/02 |
| 2019/0242924 A1* | 8/2019 | Lang | G01P 5/16 |
| 2020/0172261 A1* | 6/2020 | Hayes | B64D 45/00 |
| 2020/0183424 A1* | 6/2020 | Li | B64F 5/60 |
| 2020/0391871 A1* | 12/2020 | Essawy | G01P 21/025 |
| 2021/0364561 A1* | 11/2021 | Vallamkondu | B64F 5/60 |
| 2021/0389968 A1* | 12/2021 | Majewski | G06F 9/54 |
| 2022/0091152 A1* | 3/2022 | Naslund | B64D 43/02 |
| 2023/0249843 A1* | 8/2023 | Balasubramanian | B64D 45/00 |
| | | | 701/3 |
| 2023/0251283 A1 | 8/2023 | Balasubramanian et al. | |
| 2023/0252831 A1 | 8/2023 | Balasubramanian et al. | |
| 2024/0343399 A1* | 10/2024 | Amari | B64D 27/24 |

* cited by examiner

100

Figure 16A:
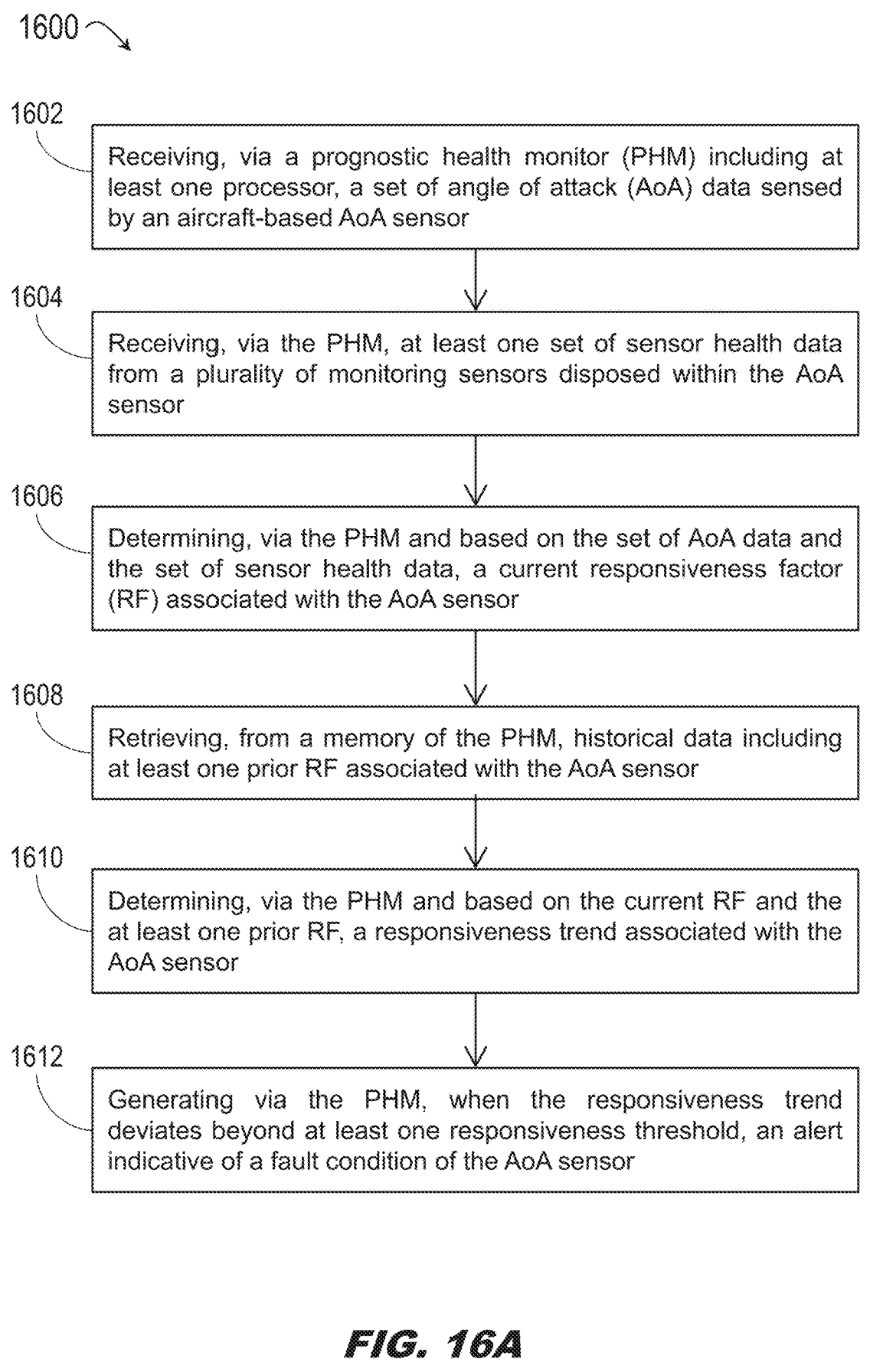

1600

1602

Receiving, via a prognostic health monitor (PHM) including at least one processor, a set of angle of attack (AoA) data sensed by an aircraft-based AoA sensor

1604

Receiving, via the PHM, at least one set of sensor health data from a plurality of monitoring sensors disposed within the AoA sensor

1606

Determining, via the PHM and based on the set of AoA data and the set of sensor health data, a current responsiveness factor (RF) associated with the AoA sensor

1608

Retrieving, from a memory of the PHM, historical data including at least one prior RF associated with the AoA sensor

1610

Determining, via the PHM and based on the current RF and the at least one prior RF, a responsiveness trend associated with the AoA sensor

1612

Generating via the PHM, when the responsiveness trend deviates beyond at least one responsiveness threshold, an alert indicative of a fault condition of the AoA sensor

Forwarding, via a communications interface of the PHM, the alert to a ground-based control station

1600

1616

Forwarding via the PHM, when the responsiveness trend is within the at least one responsiveness threshold, a nominal state of the AoA sensor to the ground control station

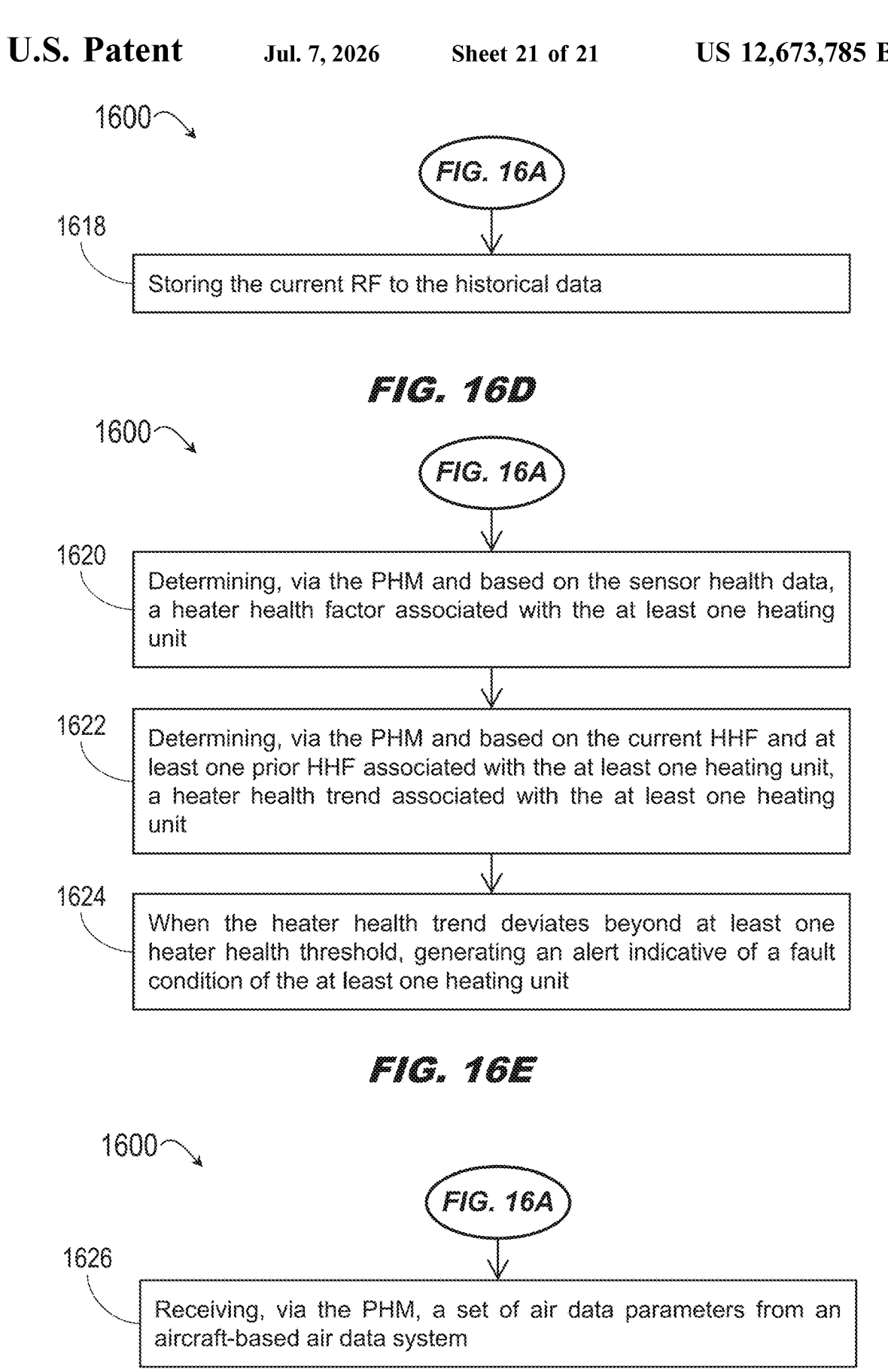

Storing the current RF to the historical data

Determining, via the PHM and based on the sensor health data, a heater health factor associated with the at least one heating unit

1622

Determining, via the PHM and based on the current HHF and at least one prior HHF associated with the at least one heating unit, a heater health trend associated with the at least one heating unit

1624

When the heater health trend deviates beyond at least one heater health threshold, generating an alert indicative of a fault condition of the at least one heating unit

Receiving, via the PHM, a set of air data parameters from an aircraft-based air data system

FIG. 16F

PROGNOSTIC HEALTH MONITOR FOR AIRCRAFT-BASED ANALOG ANGLE OF ATTACK (AOA) SENSORS

CROSS-REFERENCE TO RELATED APPLICATIONS

The present application is related to, and incorporates by reference in its entirety, the following concurrently filed applications:

U.S. patent application Ser. No. 18/672,504, and titled PROGNOSTIC HEALTH MONITOR FOR AIRCRAFT-BASED DIGITAL ANGLE OF ATTACK (AoA) SENSORS; and U.S. patent application Ser. No. 18/672,568, and titled METHOD FOR PROGNOSTIC HEALTH MONITORING ASSESSMENT OF AIRCRAFT-BASED ANGLE OF ATTACK (AoA) SENSORS.

BACKGROUND

Angle of attack (AOA) sensors are safety-critical sensors mounted on the sides of most commercial and military aircraft currently flying to measure its angle of attack, i.e., the angle between oncoming airflow and a zero line or reference line of the aircraft (e.g., a chord or wing). In the interest of redundancy, each aircraft will incorporate multiple AoA sensors. Each AoA sensor incorporates rotatable probes that protrude from the aircraft, exposed to the oncoming airflow. AoA sensors provide critical input to the stall warning module in the aircraft's flight management computer (FMC), in order to prevent the aircraft from entering a stall, e.g., where the aircraft is unable to generate sufficient lift to remain airborne.

As the rotatable probes protrude from the aircraft, they are exposed to extremely cold air temperatures and other harsh weather conditions. For example, moisture and other contaminants carried by the oncoming airflow may enter the sensors. More importantly, the probes may sustain deformation or damage due to bird strikes or debris, or may experience icing which interferes with the free rotation and/or aerodynamic characteristics of the probes, preventing the AoA sensor from reporting accurate information (which may in turn impede the functionality of stall warning systems, autopilot systems, and/or other safety-critical aircraft systems, endangering the aircraft as well as its crew and passengers). Heater wires or other heating elements and systems (e.g., positive temperature coefficient (PTR) heater elements and/or heater packs) may be incorporated into the AoA sensor, providing an operational voltage to heat the sensor and/or probes, preventing ice formation. However, prolonged usage and/or frequent on/off switching of the heating elements may lead to unexpected breakdown of the heating system.

When the AoA sensor starts to report inaccurate AoA information due to breakdown or damage, the sensor must be replaced prior to any subsequent takeoff. Current AoA sensors, while highly reliable in terms of mean time between failures (MTBF) and/or mean time between unscheduled removal (MTBUR), are unable to self-identify and/or self-isolate sensor faults due to wear, damage, deformation, or exposure to the environment. Due to the presence of redundant AoA sensors, the air data computer (or stall warning computer) can receive multiple AoA measurements and discard an outlier or deviant AoA value via voting algorithm. The air data computer may also log the faulty AoA sensor so that it is replaced on-ground before the subsequent takeoff.

However, if an AoA sensor fault is unknown until it has already caused a deviant AoA measurement, airlines must assume high inventory costs in order to replace faulty AoA sensors promptly after they are identified. Further, while deviant AoA values, and the originating faulty AoA sensors, may be identified and isolated, the air data computer cannot identify the cause or nature of the faulty performance (only that the faulty performance exists) and cannot identify a faulty sensor until faulty performance has already occurred.

SUMMARY

In an aspect, a device or system for prognostic health monitoring (PHM) of aircraft-based analog angle of attack (AoA) sensors is disclosed. In embodiments, the system includes a PHM data coordinator including one or more processors and connected to one or more analog AoA sensors, each AoA sensor further incorporating a suite of onboard monitoring sensors within the AoA sensor. The PHM system further includes memory or like data storage for storage of historical sensor responsiveness data. The PHM data coordinator samples raw analog AoA data collected by each AoA sensor, as well as concurrent sensor health data collected by the monitoring sensors. Based on sampled analog AoA data and concurrent sensor health data, the PHM data coordinator determines a current responsiveness factor (RF) for each reporting analog AoA sensor. The PHM data coordinator refers to historical RF data for each analog AoA sensor and determines a sensor responsiveness trend over time. When the responsiveness factor for any AoA sensor trends beyond a responsiveness threshold, the PHM data coordinator generates an alert for ground-based preventative maintenance personnel, the alert indicative of fault conditions specific to the deviant analog AoA sensor. The PHM data coordinator forwards the alert to ground-based preventative maintenance personnel or a ground control station.

In some embodiments, generated and forwarded alerts identify the deviant analog AoA sensor among the set of aircraft-based analog AoA sensors reporting to the PHM system.

In some embodiments, the PHM memory stores configuration files establishing system parameters, e.g., a sampling rate for AoA data and sensor health data, threshold levels for responsiveness parameters, other conditions warranting an alert (e.g., duration of deviation).

In some embodiments, when the sensor responsiveness trend for an analog AoA sensor is trending within responsiveness thresholds, the PHM data coordinator generates a status report indicative of nominal operation of the analog AoA sensor.

In some embodiments, the PHM data coordinator only generates an alert when the sensor responsiveness trends beyond a responsiveness threshold for at least a threshold duration (e.g., as opposed to an instantaneous or momentary deviation).

In some embodiments, when sensor responsiveness trends above an upper responsiveness threshold (e.g., excessive sensor responsiveness), the PHM data coordinator generates an alert indicative or one or more of an underdamping fault, a counterweight fault, or a damper failure of the deviant analog AoA sensor.

In some embodiments, when sensor responsiveness trends below a lower responsiveness threshold (e.g., insufficient sensor responsiveness), the PHM data coordinator generates an alert indicative of one or more of an overdamping fault or a jammed sensor probe (due to, e.g., damage, deformation, and/or ice formation) associated with the deviant analog AoA sensor.

In some embodiments, the reporting analog AoA sensor incorporates heating elements and/or a heating system, and when sensor responsiveness trends below the lower responsiveness threshold, the PHM data coordinator generates an alert indicative of a fault in, or failure of, the heating element/s and/or heating system.

In some embodiments, the reporting analog AoA sensor incorporates heating elements and/or a heating system, and the PHM data coordinator determines a current heater health factor (HHF) based on the sensor health data sampled from the onboard monitoring sensors. Referring to historical HHF data stored to memory, the PHM data coordinator determines trending heater health over time based on the current and historical HHF data. When the heater health factor for the reporting analog AoA sensor trends beyond a heater health threshold, the PHM data coordinator generates an alert indicative of a fault or failure in the heating element/s and/or heating system.

In some embodiments, PHM configuration files define dynamic sensor responsiveness thresholds for a reporting analog AoA sensor based on one or more of the operational age of the analog AoA sensor (e.g., thresholds narrow as the AoA sensor ages) and/or the current flight segment (e.g., takeoff, climb, cruise, descent, landing).

In some embodiments, the PHM data coordinator stores current responsiveness factor (RF) data to memory along with historical RF data for that analog AoA sensor.

In some embodiments, the onboard suite of monitoring sensors within each analog AoA sensor includes one or more of an accelerometer (e.g., three-axis), current monitor, voltage monitor, and temperature sensor.

In some embodiments, the PHM data coordinator is embodied in an aircraft-based line replaceable unit (LRU).

In some embodiments, the PHM coordinator is integrated as a function or module running within an aircraft-based Aircraft Interface Device (AID), flight data concentrator (FDC), or like avionics or aircraft-based system.

In some embodiments, the onboard suite of monitoring sensors includes signal conditioning circuitry for pre-processing and filtering of sensor health data. For example, before forwarding to the PHM data coordinator, sensor health data may be filtered or otherwise processed to remove noise, dither, vibration (e.g., due to airframe vibration) and/or inconsistency.

In some embodiments, the PHM data coordinator filters or pre-processes sampled analog AoA data to remove noise, dither, and/or vibration.

In some embodiments, the PHM data coordinator receives sampled AoA data and/or sensor health data via a wireless communications interface with one or more analog AoA sensors.

In some embodiments, the PHM data coordinator is embodied in either a cloud-based processing infrastructure or a ground-based device wirelessly linked to the aircraft-based analog AoA sensor/s.

In some embodiments, the PHM data coordinator is further connected to an aircraft-based air data computer (ADC) or other like air data system, and samples concurrent air data parameters (e.g., altitude, airspeed) from the air data system. For example, the current responsiveness factor (RF) for the one or more analog AoA sensors may be based on the air data parameters as well as the sampled analog AoA data and sensor health data.

In some embodiments, a PHM alert indicative of a fault condition additionally includes a magnitude of the current sensor responsiveness factor and/or a rate of change (e.g., slope) of the deviant trending responsiveness factor.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 16A through 16F are process flow diagrams illustrating a method for prognostic health monitoring of analog or digital AoA sensors according to example embodiments of this disclosure.

DETAILED DESCRIPTION

Figure 1:
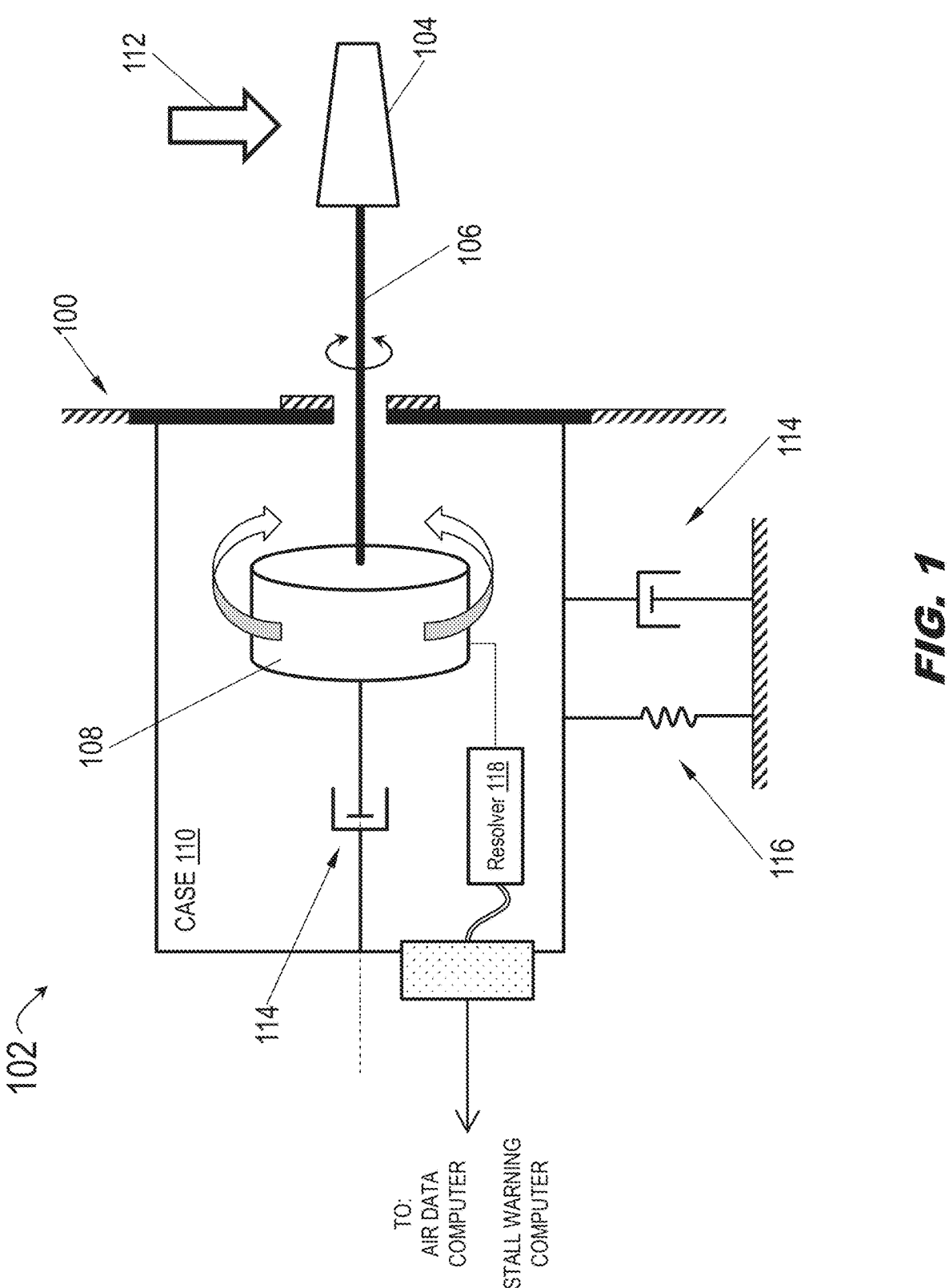
FIG. 1 is a block diagram illustrating an aircraft-based analog angle of attack (AoA) sensor.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for prognostic health monitoring (PHM) of aircraft-based angle of attack (AoA) sensors, whether said sensors are analog or digital. For example, PHM systems as disclosed herein monitor critical parameters and/or characteristics of the AoA sensors (e.g., each of a suite of multiple redundant AoA sensors deployed throughout the aircraft) relative to dynamic performance thresholds specific to each AoA sensor, and processes the parameters to identify specific fault conditions and/or performance degradation that may lead to imminent failure of an AoA sensor before the failure (e.g., deviation in reported AoA data) occurs, reporting said fault conditions and/or performance degradations in real time to minimize operational disruptions. For example, rather than merely detecting a deviant AoA value, PHM systems may identify specific issues with respect to the responsiveness of the AoA sensor, e.g., underdamping or overdamping; jamming of sensor probes due to icing, damage or deformation; and or counterweight failures that affect sensor performance in detectable ways and may be predictive of imminent failure of the sensor.

Referring now to FIG. 1, an aircraft-based (100) analog angle of attack (AoA) sensor 102 is shown. The analog AoA sensor 102 may include a probe 104 protruding from the fuselage of the aircraft 100 (e.g., via a shaft 106) and balanced with a counterweight 108 (e.g., within a case or housing 110), the probe and shaft rotating to align with aerodynamic forces (e.g., airflow 112) acting on the probe. The probe 104 may include a vane, cone, or any similarly appropriate structure capable of rotational motion in response to the airflow 112. The analog AoA sensor 102 may further include (e.g., also within the housing 110) damper elements 114 for damping the rotational motion of the probe 104 and shaft 106, spring elements 116, and a resolver 118 for transforming the rotational movement of the probe 104 and shaft 106 into AoA data (202, FIG. 2), e.g., a voltage value proportional to the current angle of attack of the aircraft 100.

Figure 2:
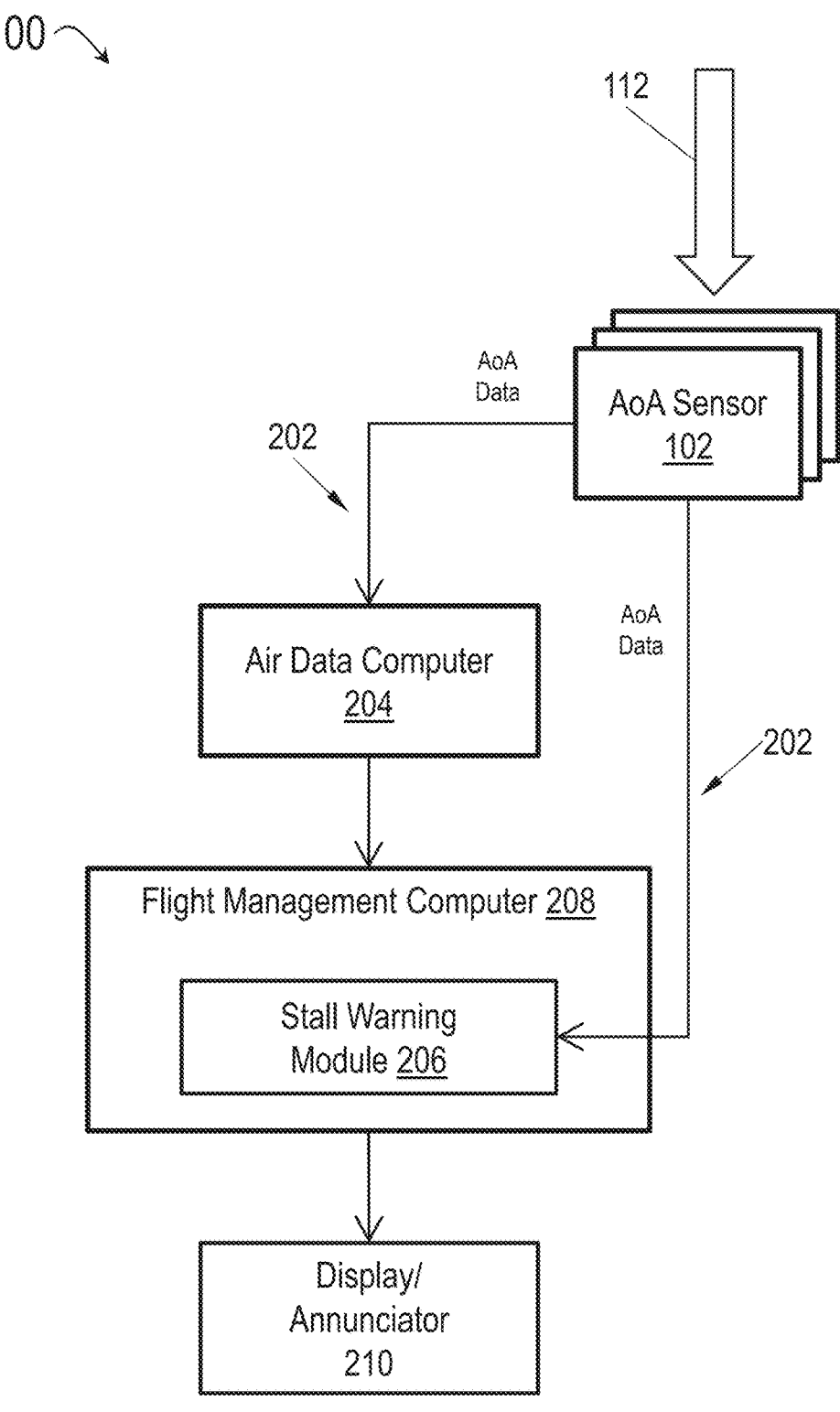
FIG. 2 is a block diagram illustrating other aircraft-based avionics systems dependent on AoA measurements from the AoA sensor of FIG. 1.

Referring also to FIG. 2, the aircraft 100 is shown.

As airflow 112 acts on the probes (104, FIG. 1) of the analog AoA sensor 102, AoA data 202 is provided by the resolver (118, FIG. 1) of the analog AoA sensor 102 to the air data computer 204 and stall warning module 206, e.g., within the flight management computer 208 (FMC; also flight management system (FMS)). Within the FMC 208, AoA data may be subject to voting algorithms as described above (e.g., to discard deviant AoA data), and provided to other operational and/or navigational systems aboard the aircraft 100, including flight deck displays and/or annunciators 210.

Figure 3:
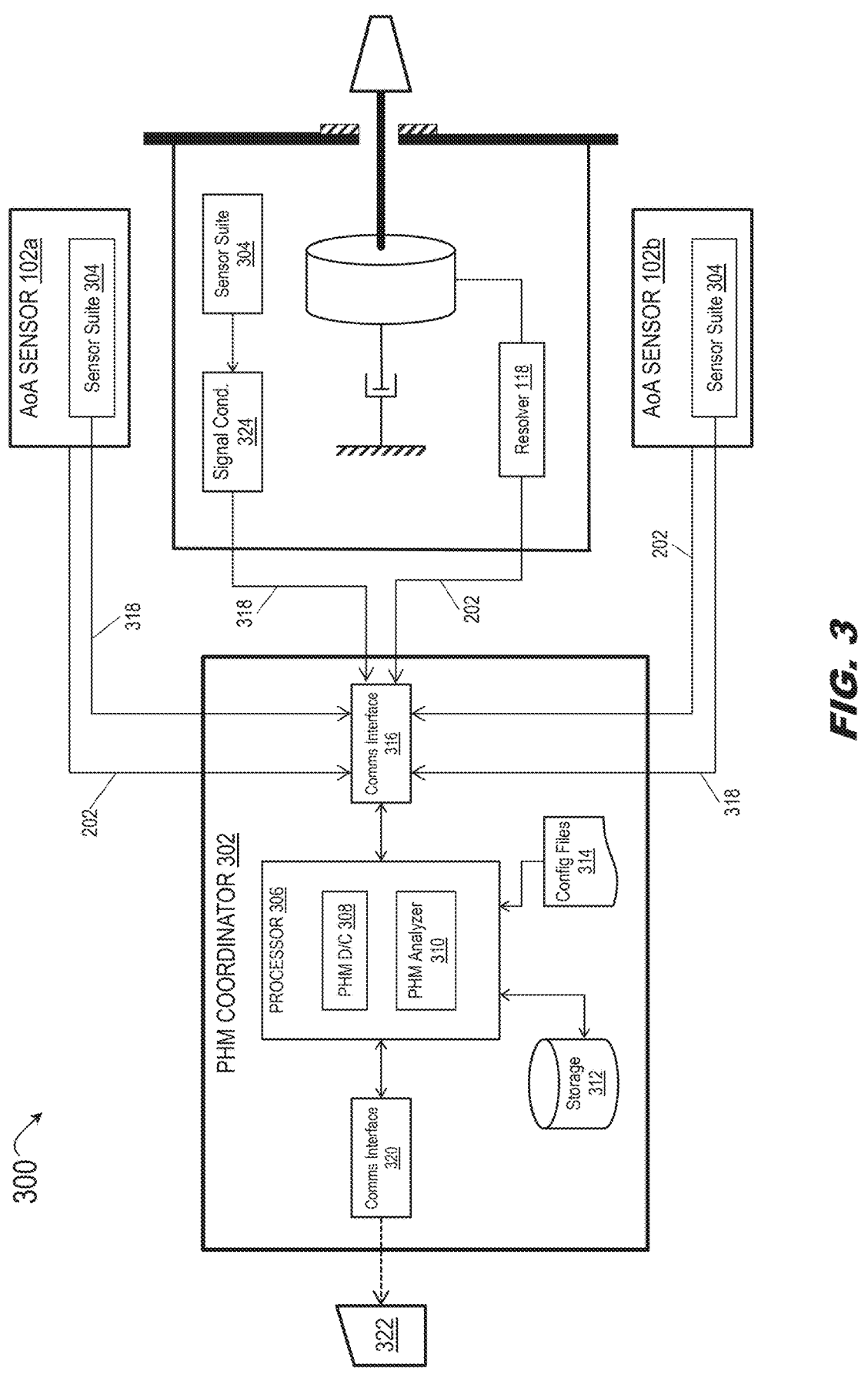
FIG. 3 is a block diagram illustrating a prognostic health monitoring (PHM) system incorporating a PHM coordinator for monitoring the health and/or performance of the analog AoA sensor of FIG. 1, according to example embodiments of this disclosure.

Referring now to FIG. 3, a system 300 for prognostic health monitoring (PHM) of one or more analog AoA sensors 102 aboard the aircraft (100, FIG. 1) is shown. In embodiments, the PHM system 300 may include a PHM coordinator 302 and sensor suites 304 within the AoA sensor 102 (e.g., within each of multiple AoA sensors 102, 102a, 102b aboard the aircraft 100).

In embodiments, the PHM coordinator 302 may include a processing unit 306 incorporating a data concentrator 308 and a PHM analyzer 310 (the PHM analyzer incorporating one or more PHM algorithms), memory 312 or data storage, configuration files 314 defining operations of the PHM coordinator, a first or internal communications interface 316 configured for receiving AoA data 202 and sensor health data 318 from, respectively, each analog AoA sensor 102, 102a, 102b and a suite 304 of monitoring sensors within each analog AoA sensor. The PHM coordinator 302 may further include a second or external communications interface 320, via which outputs of the PHM coordinator 302 (e.g., alerts and/or status reports for each analog AoA sensor 102, 102a, 102b) may be provided to an external source, e.g., to a ground control station 322 (e.g., fixed-location or mobile, vehicle-based ground stations) remotely located from the aircraft 100, for further processing. For example, the data concentrator 308 may receive current AoA data 202 sensed by each analog AoA sensor 102, 102a, 102b along with concurrent sensor health data 318 sensed by the monitoring sensor suite 304 disposed within each individual analog AoA sensor. In embodiments, the PHM coordinator 302 may sample AoA data 202 and sensor health data 318 at a sampling rate determined by the configuration files 314. In some embodiments, each AoA sensor 102, 102a, 102b may include signal conditioning circuits 324 for filtering and/or processing of sensor health data 318, as described in greater detail below.

In embodiments, the memory 312 may store prior responsiveness data specific to each analog AoA sensor 102, 102a, 102b, e.g., with respect to the current flight, with respect to specific segments of the current flight (e.g., takeoff, climb, cruise, descent, landing), with respect to the operational life of the AoA sensor. For example, based on the AoA data 202 and sensor health data 318 received from each analog AoA sensor 102, 102a, 102b, the PHM analyzer 310 may, via PHM algorithms, determine a current responsiveness factor (RF) indicative of the current health of that analog AoA sensor. Further, by comparing the current RF of a given analog AoA sensor 102, 102a, 102b relative to prior responsiveness factors for that analog AoA sensor, the PHM analyzer 310 may determine a current responsiveness trend for that analog AoA sensor. In embodiments, if the responsiveness trend for any analog AoA sensor 102, 102a, 102b is trending beyond a responsiveness threshold (e.g., as defined in the configuration files 314), the PHM coordinator 302 may generate an alert indicative of a fault condition, e.g., a potential fault or imminent failure of that analog AoA sensor. For example, the PHM coordinator 302 may generate an alert if the responsiveness trend for a particular analog AoA sensor 102, 102a, 102b trends beyond a particular responsiveness threshold for at least a threshold duration. Similarly, the PHM coordinator 302 may generate an alert whenever a particular responsiveness trend exceeds or subceeds a responsiveness threshold for any duration, regardless of duration (e.g., if a responsiveness trend advances beyond a threshold level but then retreats behind the threshold). For example, responsiveness threshold levels, as well as conditions for what level of deviation triggers an alert indicative of a fault condition, may be defined by the configuration files 314.

In embodiments, the PHM coordinator 302 may generate a specific type of alert based on the nature of the deviation of the responsiveness trend, e.g., which responsiveness threshold is surpassed, as is described in greater detail below. Alternatively, if the PHM coordinator 302 determines that the responsiveness factor for a given analog AoA sensor 102, 102a, 102b is consistently trending within responsiveness thresholds, the PHM coordinator may generate a report of nominal operations of that analog AoA sensor. Similarly, the configuration files 314 may determine whether or not the PHM coordinator 302 generates a status report of nominal operations of an analog AoA sensor 102, 102a, 102b.

In some embodiments, an alert relative to a deviation beyond a responsiveness threshold may include additional information. For example, while deviation beyond a responsiveness threshold may be indicative of a failure of an analog AoA sensor 102, 102a, 102b, a rate of change of the responsiveness factor may be indicative of imminent failure of the analog AoA sensor even if the responsiveness factor has not yet trended beyond a responsiveness threshold. Accordingly, an alert related to a deviation of the responsiveness trend beyond a responsiveness threshold may include the magnitude of the current responsiveness factor and/or a rate of change (e.g., slope) of the responsiveness trend (e.g., as the trending RF approaches and/or breaches the responsiveness threshold).

In embodiments, the PHM coordinator 302 may forward any alerts and/or status reports generated with respect to a particular analog AoA sensor 102, 102a, 102b to the ground control station 322 via the external communications interface 320. For example, alerts and/or status reports output by the PHM coordinator 302 may uniquely identify the associated analog AoA sensor 102, 102a, 102b from which the alert originated. Further, based on alerts relayed by the PHM coordinator 302, preventative maintenance personnel may take action (e.g., inspection, repair, replacement) with respect to any analog AoA sensor 102, 102a, 102b when the aircraft 100 has landed.

Figure 4:
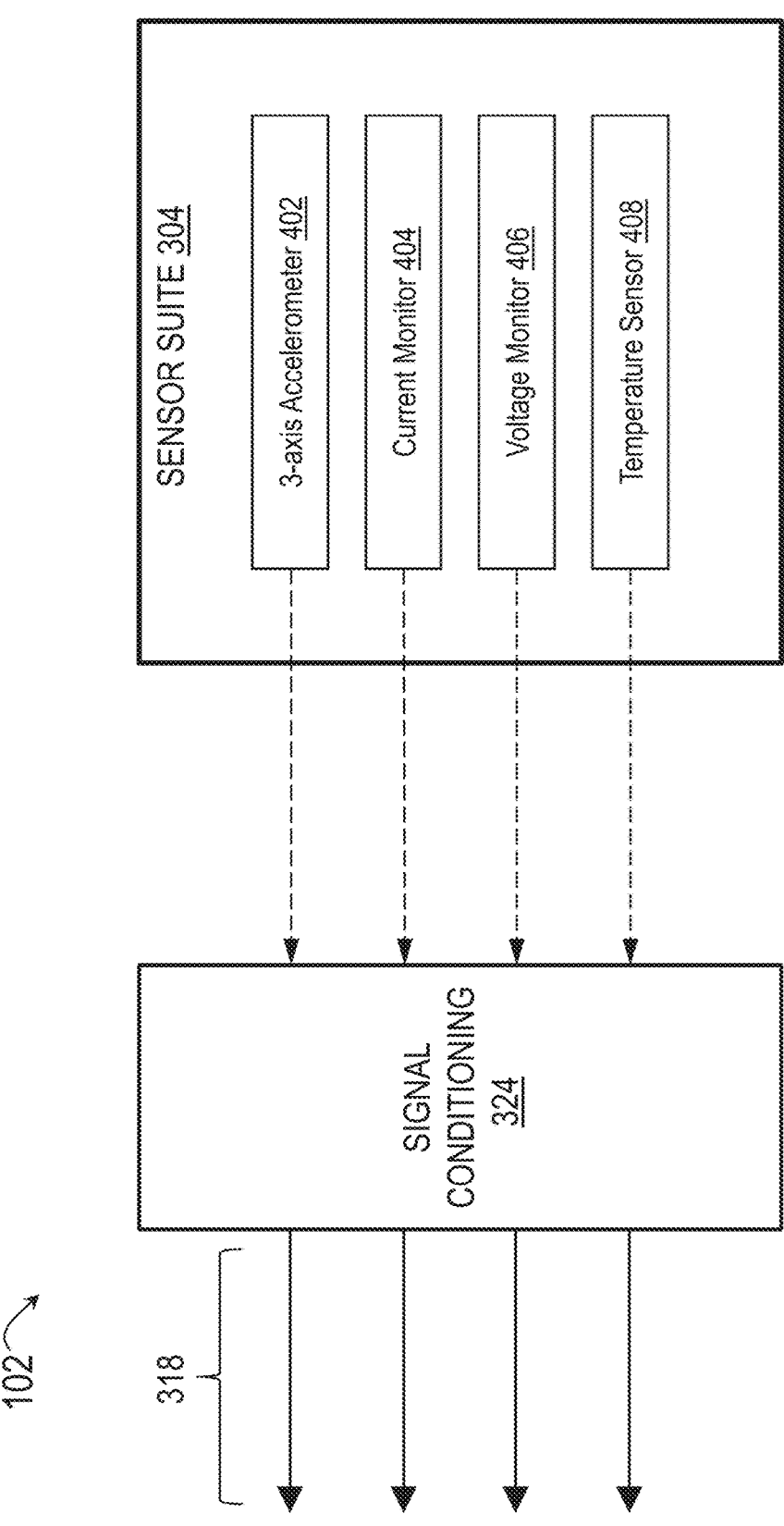
FIG. 4 is a block diagram illustrating a suite of health monitoring sensors of the PHM system of FIG. 3.

Referring now to FIG. 4, the monitoring sensor suite 304 may be disposed within each analog AoA sensor 102 to monitor sensor characteristics of the analog AoA sensor 102.

In embodiments, the monitoring sensor suite 304 may include a three-axis accelerometer 402, a current monitor 404, voltage monitor 406, temperature sensor 408, and potentially other sensors configured to collect data relevant to the health of the analog AoA sensor 102 and/or its components. For example, the monitoring sensor suite 304 may track currents drawn by the heating elements (e.g., positive temperature coefficient (PTC) heater packs) within the analog AoA sensor 102, voltages drawn by the sensor electronics, vibrations of the embodying aircraft 100, temperatures within the analog AoA sensor and/or the probe 104. In some embodiments, sensor health data 318 may be used by the PHM system to assess a heater health factor of heating elements or heating systems within an analog AoA sensor 102, as well determine trending heater health (e.g., with reference to prior heater health factors, similarly to the sensor responsiveness factor and responsiveness trend disclosed above. For example, configuration files 314 may additionally include heater health thresholds; if heater health trends beyond a threshold level, an alert may be generated indicative of a fault condition and/or failure of the heating elements and/or heating system associated with an analog AoA sensor 102. In some embodiments, the monitoring sensor suite 304 may include additional sensors.

In embodiments, each analog AoA sensor 102 may further include signal conditioning circuits 324. For example, the signal conditioning circuits 324 may incorporate digital filters and other signal processing techniques to remove noise, dither, and/or inconsistencies from signals provided by the monitoring sensors 402-408; the filters and/or processed signals may then be provided to the PHM coordinator (302, FIG. 3).

Figure 5:
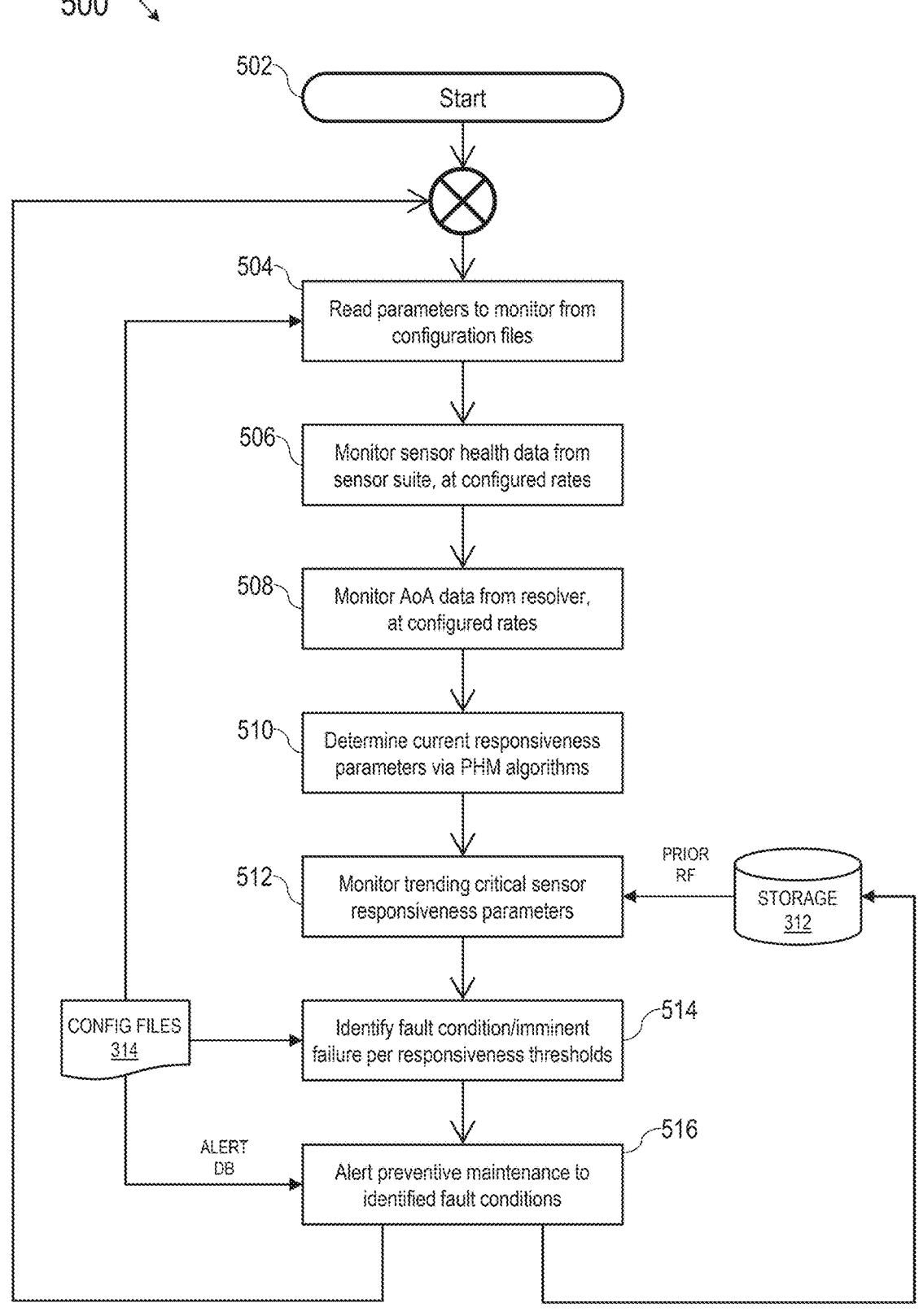
FIG. 5 is a flow diagram illustrating an operational flow of the PHM coordinator of FIG. 3.

Referring now to FIG. 5, an operational flow 500 of the PHM coordinator (302, FIG. 3) is shown.

At a point 502, the operational flow 500 starts.

At a point 504, the PHM data concentrator 308 reads parameters from its configuration files 314, the configuration parameters determining and/or defining sampling rates. For example, configuration files 314 may be read at system startup and used throughout the duration of a flight plan. In embodiments, other configuration parameters defined by the configuration files 314 may include device identification and/or location parameters (e.g., device installation location) stored to memory 312.

At a point 506, the PHM data concentrator 308 samples sensor health data (318, FIG. 3) collected by the component sensors (402-408, FIG. 4) of the monitoring sensor suite (304, FIG. 4) at a sampling rate predetermined by the configuration files 314.

At a point 508, the PHM data concentrator 308 samples concurrent AoA data (202, FIG. 2) sensed by the analog AoA sensor/s (102, FIG. 1) at the same predetermined sampling rate.

At a point 510, the PHM analyzer 310 processes AoA data 202 and sensor health data 318 to determine a current responsiveness factor (RF) and/or other critical sensor parameters of the analog AoA sensor 102.

At a point 512, the PHM analyzer 310 refers to prior responsiveness factors stored to memory (312, FIG. 3) to determine a current responsiveness trend of the analog AoA sensor 102 over time.

At a point 514, the PHM analyzer 310 detects a fault condition and/or imminent failure of the analog AoA sensor 102, e.g., if the responsiveness trend deviates beyond a responsiveness threshold defined by the configuration files 314. For example, the precise nature of the fault condition and/or imminent failure of the analog AoA sensor 102 may depend on the specific threshold breached by the responsiveness trend, as disclosed in greater detail below. In embodiments, threshold levels, alert types (e.g., and their relationships to responsiveness thresholds, and/or alert triggering conditions) may likewise be defined by the configuration files 314.

At a point 516, the PHM coordinator 302 generates alerts based on any fault conditions and/or imminent failures identified with respect to specific analog AoA sensors 102 and forwards the alerts to preventive maintenance personnel on the ground (or, e.g., to other ground control facilities). Further, the PHM coordinator 302 stores any generated alerts, along with updated sensor responsiveness factor data, to memory 312 for use in future trend monitoring.

Figures 6A, 6B:
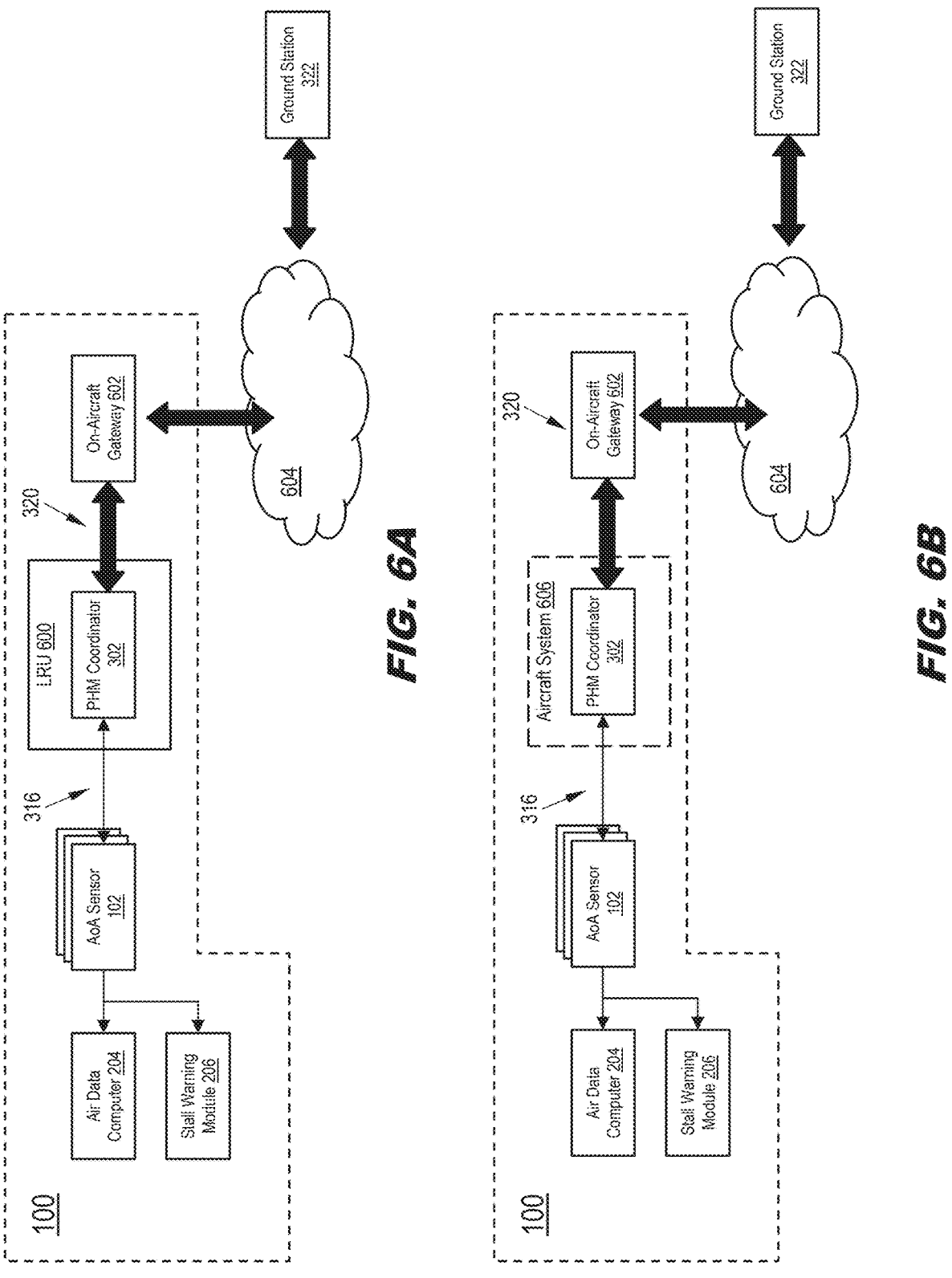
FIG. 6A is a block diagram of the PHM coordinator of FIG. 3 implemented as an aircraft-based standalone line replaceable unit (LRU)
FIG. 6B is a block diagram of the PHM coordinator of FIG. 3 integrated into an aircraft-based system.

Referring to FIGS. 6A and 6B, the aircraft 100 is shown.

Referring in particular to FIG. 6A, in embodiments the PHM coordinator 302 may be implemented as a standalone avionics line replaceable unit 600 (LRU). For example, the LRU may be an aircraft-based device disposed between the analog AoA sensor/s 102 and the external communications interface/s 320, and connected to the internal communications interface/s 316). For example, internal communications interfaces 316 via which the PHM coordinator 302 interfaces with the analog AoA sensors may be wired or physical interfaces, e.g., Ethernet, avionics full-duplex switched internet (AFDX), ARINC 429, RS-232/422/485, CAN, and other analog interface types. Alternatively, if one or more analog AoA sensors 102 are capable of wireless communications, the PHM coordinator 302 may interface with these analog AoA sensors via Wifi, Bluetooth, or any other appropriate wireless communication protocol.

In embodiments, the external communications interface 320 via which the PHM coordinator 302 forwards alerts and status information to the ground control station 322 may include wired/physical and/or wireless communication interfaces as described above and/or Aircraft Interface Devices (AID) or any other appropriate aircraft-based gateway 602. For example, the aircraft-based gateway 602 may connect the PHM coordinator 302 with other aircraft-based air-to-ground communication devices, interfaces, and/or protocols, e.g., satellite communications (satcom), Aircraft Communication Addressing and Reporting System (ACARS), in-flight entertainment (IFE) servers. In embodiments, aircraft-based gateways 602 may establish communication paths for the PHM coordinator 302 to push alerts through to the appropriate preventative maintenance personnel on the ground (e.g., at the current destination airport of the aircraft 100) through any appropriate cloud-based infrastructure 604 and/or ground control stations 322.

Referring now to FIG. 6B, in some embodiments the PHM coordinator 302 may be implemented as a function or module configured for execution within, or otherwise integrated as a component of, another aircraft system 606 (e.g., within the AID, within a flight data concentrator (FDC)). For example, the PHM coordinator 302 function or module may rely on communication interfaces already available to the embodying aircraft system 606 to push PHM alerts and/or status reports through to preventive maintenance personnel (e.g., via cloud-based infrastructure 604 and/or ground control stations 322).

Figures 6C, 6D:
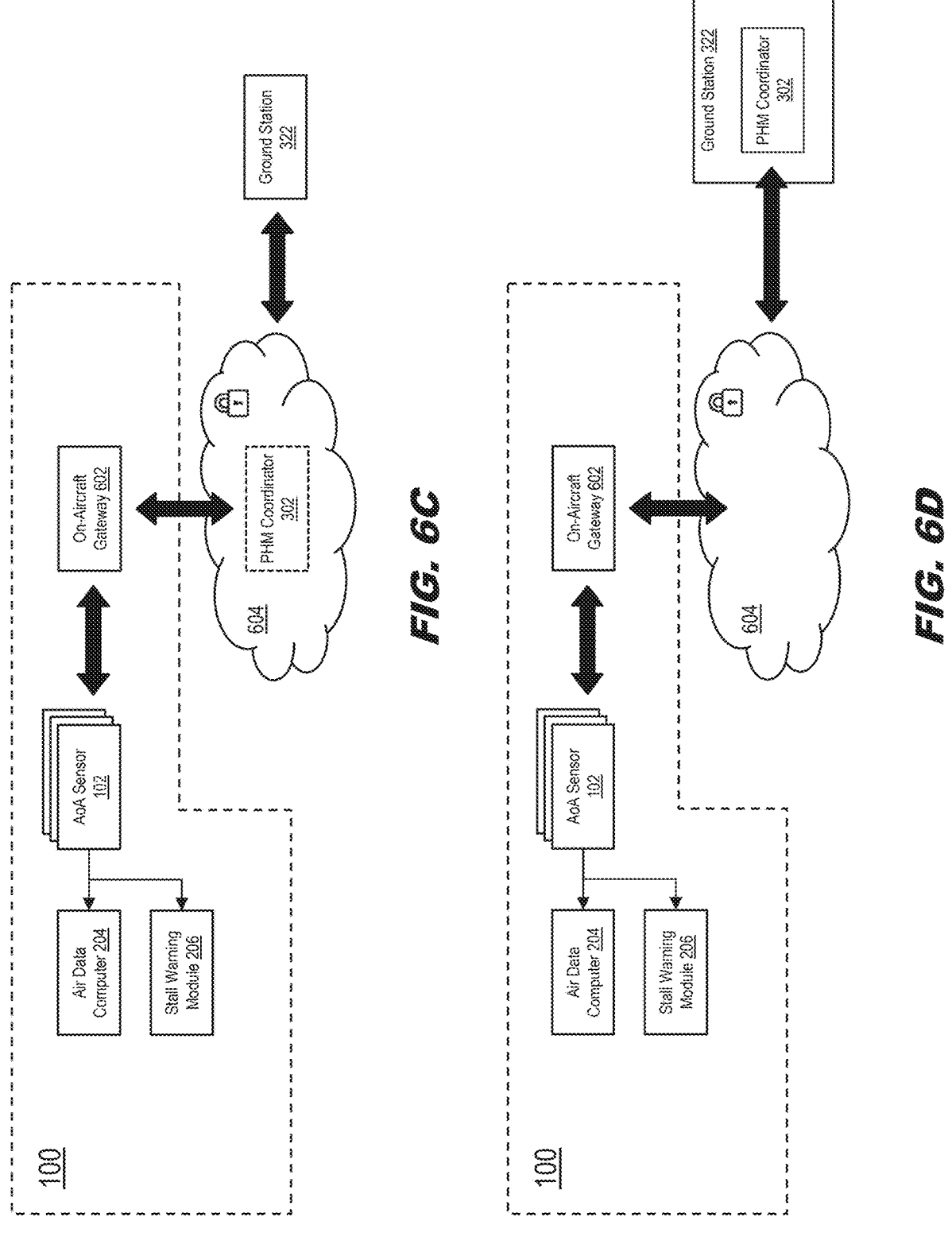
FIG. 6C is a block diagram illustrating the PHM coordinator of FIG. 3 implemented in a cloud-based infrastructure.
FIG. 6D is a block diagram illustrating the PHM coordinator of FIG. 3 implemented in a ground-based station remotely located from the aircraft.

Referring now to FIGS. 6C and 6D, in some embodiments, as described in greater detail below (see, e.g., FIGS. 10A-B and accompanying text), the internal communications interface 316 may be wireless and the PHM coordinator 302 located remotely from the AoA sensor/s 102 and the aircraft 100. For example, the PHM coordinator 302 may be implemented within the cloud-based infrastructure 604 or as a ground-based device (e.g., connected via a physical or wireless external communications interface 320 to the ground station 322).

Figure 7:
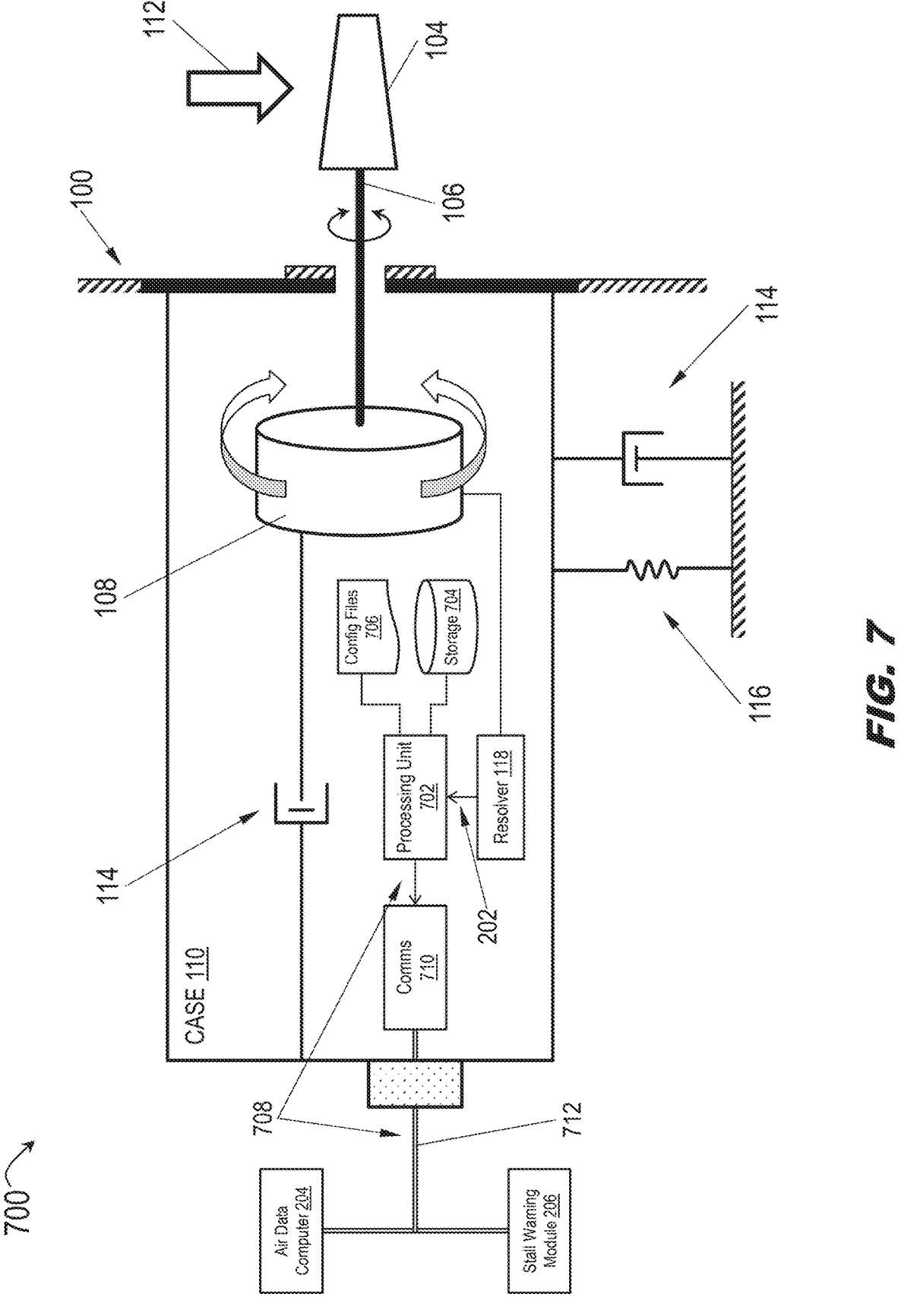
FIG. 7 is a block diagram illustrating an aircraft-based digital AoA sensor.

Referring now to FIG. 7, the aircraft 100 is shown. Similarly to the analog AoA sensor 102 shown by FIG. 1, a digital AoA sensor 700 may include (in addition to the probe 104, shaft 106, counterweight 108, housing or case 110, damper elements 114, spring elements 116, and resolver 118) onboard processing unit 702, memory/data storage 704, and configuration files 706.

In embodiments, the digital AoA sensor 700 may be implemented similarly to the analog AoA sensor 102 shown by FIG. 1, except that the digital AoA sensor 700 may incorporate an onboard processing unit 702 configured for converting AoA data 202 output by the resolver 118 into digital AoA data 708, e.g., digital signals transmittable via communications interface 710 and digital avionics bus 712 (to, e.g., the air data computer 204 and/or stall warning module 206.

Figure 8:
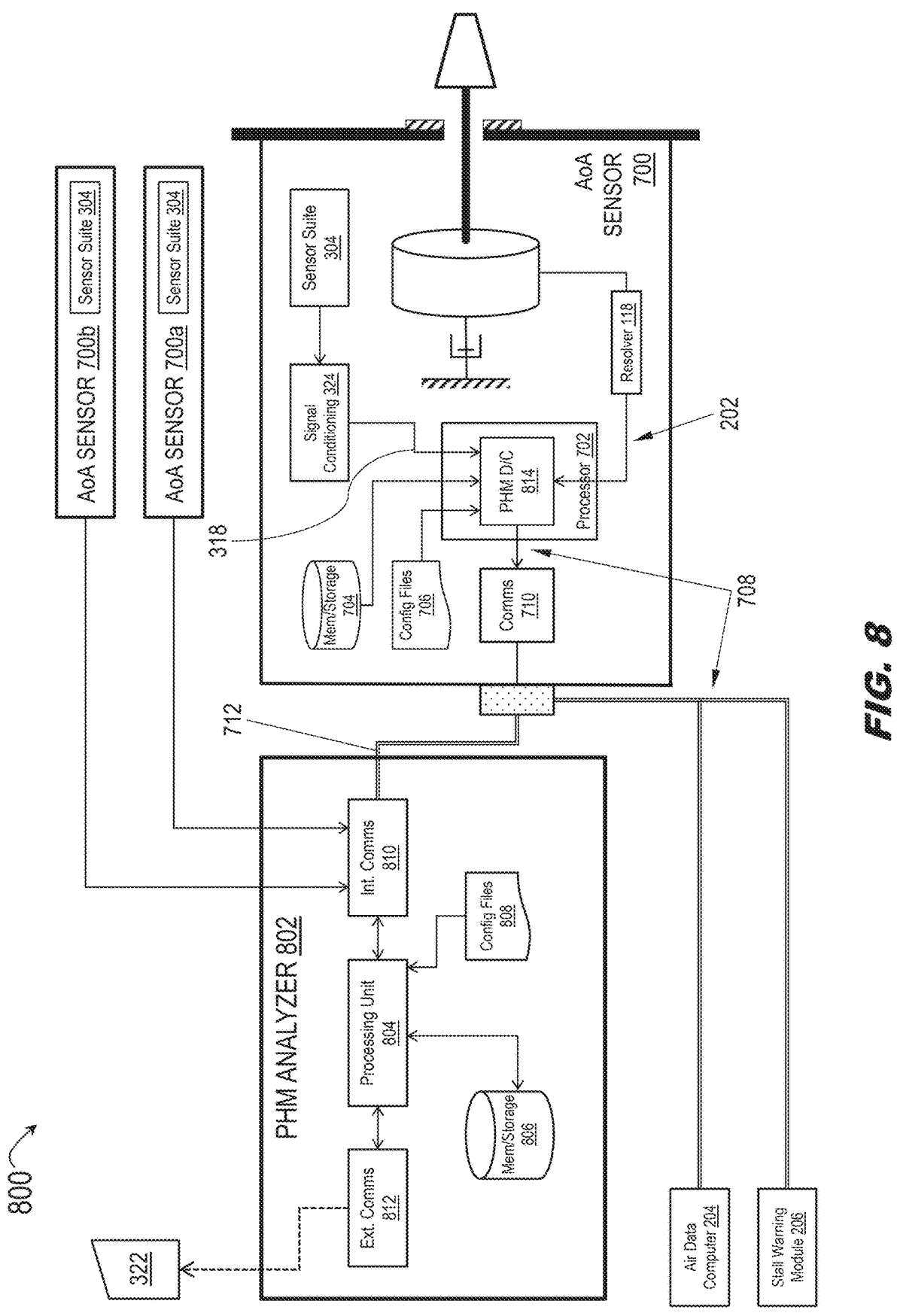
FIG. 8 is a block diagram illustrating a PHM system incorporating a PHM analyzer for monitoring the health and/or performance of the digital AoA sensor of FIG. 7, according to example embodiments of this disclosure.

Referring now to FIG. 8, a system 800 for prognostic health monitoring (PHM) of one or more digital AoA sensors 700 is shown. The digital PHM system 800 may include a PHM analyzer 802 incorporating a processing unit 804, memory 806, configuration files 808, and internal/external communications interfaces 810, 812.

In embodiments, the PHM system 800 may be implemented and may function similarly to the system 300 (FIG. 3) for prognostic health monitoring of analog AoA sensors 102 (FIG. 1), except that the PHM system 800 may include a PHM analyzer 802 configured to receive digital AoA data 708 and sensor health data 318 from the digital AoA sensor 700 (e.g., from each digital AoA sensor 700, 700a, 700b and its component monitoring sensor suite 304).

In embodiments, the processing unit 702 within each digital AoA sensor 700 may implement a PHM data concentrator 814. For example, the PHM data concentrator 814 within each digital AoA sensor 700 may continually monitor digital AoA data 708 provided by the resolver 118 and sensor health data 318 collected by the monitoring sensor suite 304 (e.g., via its component sensors 402-408 and signal conditioning circuits 324, as shown in detail by FIG. 4). In embodiments, the PHM data concentrator 814 may sample digital AoA data 708 and sensor health data 318 (e.g., at sampling rates predetermined by the configuration files 808), compiling concurrent sets of digital AoA data and corresponding sensor health data into data packages, providing the sampled data packages to the PHM analyzer 802 via communications interfaces 710, 810 and digital avionics bus 712. For example, the PHM analyzer 802 (e.g., via its onboard processing unit 804) may, based on each received package of concurrent digital AoA data 708 and sensor health data 318, determine a current responsiveness factor (RF) for the corresponding digital AoA sensor 700, 700a, 700b from which the digital AoA data and sensor health data originated. Further, the PHM analyzer 802 may refer to prior and/or historical responsiveness factors (e.g., stored to memory 806) to monitor responsiveness trends with respect to each digital AoA sensor 700, 700a, 700b. If, for example, the responsiveness factor for a given digital AoA sensor 700, 700a, 700b is trending beyond responsiveness thresholds (e.g., on a momentary basis, for at least a threshold duration), the PHM analyzer 802 may generate an alert based on the specific responsiveness threshold breached, as disclosed in greater detail below. Similarly, if the responsiveness factor for a given digital AoA sensor 700, 700a, 700b is consistently trending between responsiveness thresholds, the PHM analyzer 802 may generate a status report indicating that the digital AoA sensor is operating nominally. For example, threshold levels, alert triggering conditions, and/or specific alert types associated with a particular triggering condition or set thereof (including whether or not, or how frequently, a nominal sensor status is to be reported) may be defined by the configuration files 808.

In embodiments, the PHM analyzer 802 may forward any alerts and/or status reports to preventative maintenance personnel on the ground (e.g., via ground control stations 322) via the external communications interface/s 812.

As shown by FIGS. 7 and 8, the digital AoA sensors 700, 700a, 700b may utilize the communications interface 710 and digital avionics bus 712 for data transfer to the PHM analyzer (802, FIG. 8), the communications interface 710 including any appropriate wired or physical communications interface (e.g., Ethernet, avionics full-duplex switched internet (AFDX), ARINC 429, RS-232/422/485, CAN) for providing digital AoA data 708 and sensor health data 318 (e.g., as sampled and packetized by the PHM data concentrator 814) to the PHM analyzer (802, FIG. 8) as well as the air data computer 204 and stall warning module 206.

Figure 9:
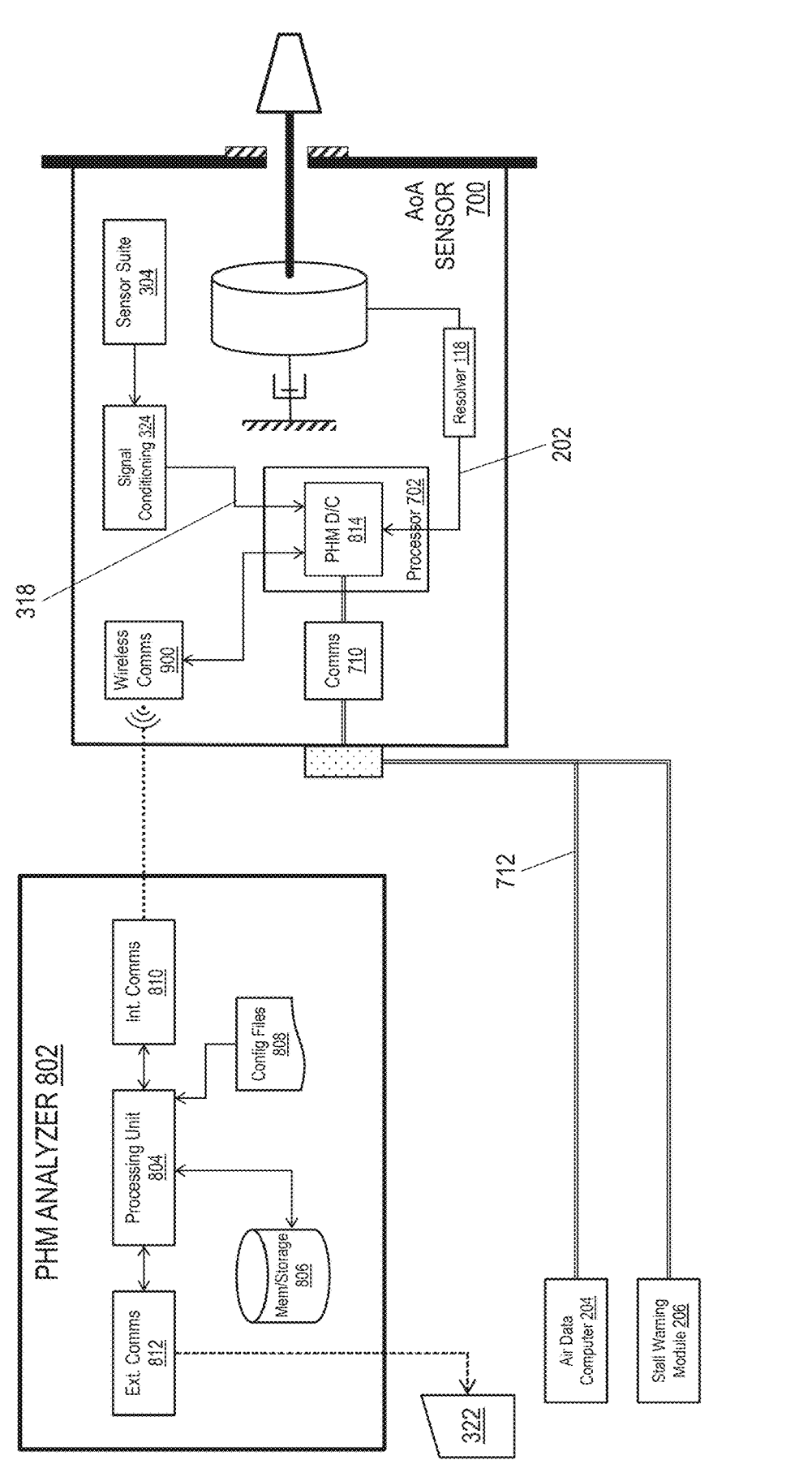
FIG. 9 is a block diagram of the PHM system of FIG. 8 incorporating a wireless communications interface between the digital AoA sensor and the PHM analyzer.

Referring now to FIG. 9, in some embodiments the digital AoA sensor/s 700, 700a, 700b may utilize a wireless communications interface 900 for providing digital AoA data 708 to the PHM analyzer 802. For example, the wireless communications interface 900 may incorporate WiFi, Bluetooth, or any other appropriate wireless communications protocol.

Figures 10A, 10B:
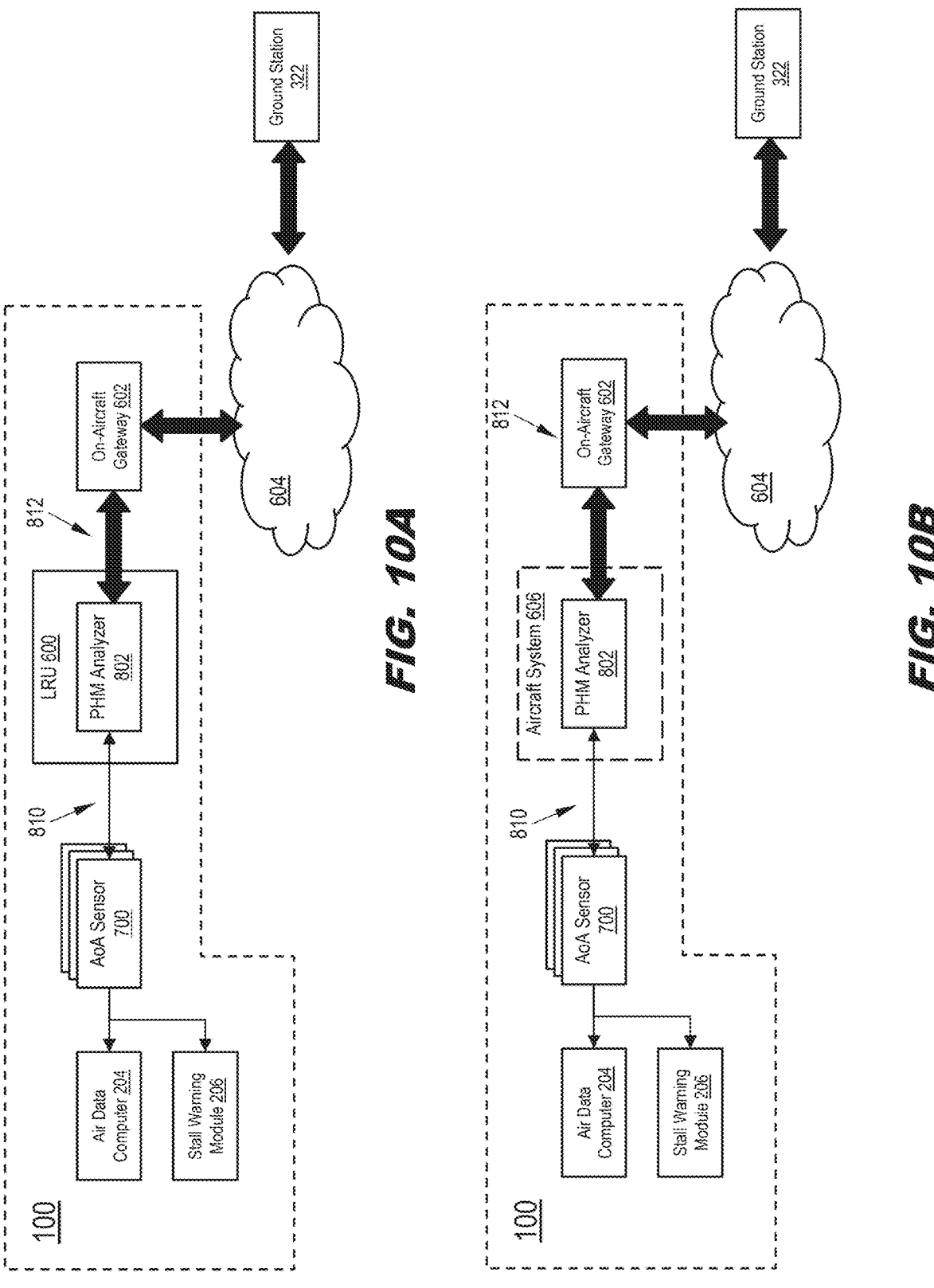
FIG. 10A is a block diagram illustrating the PHM analyzer of FIG. 8 implemented as an aircraft-based standalone line replaceable unit (LRU)
FIG. 10B is a block diagram illustrating the PHM analyzer of FIG. 8 integrated into an aircraft-based system.

Referring now to FIG. 10A, in some embodiments the PHM analyzer 802 may be implemented as a standalone avionics LRU 600 aboard the aircraft 100 (e.g., similarly to the implementation of the PHM coordinator 302, as shown by FIG. 6A). For example, the LRU 600 including the PHM analyzer 802 may receive sets of digital AoA data 708 and sensor health data 318 from one or more digital AoA sensors 700 via the communications interface 810 and provide sensor responsiveness information (e.g., alerts, status reports) to preventative maintenance personnel on the ground (e.g., at the ground station 322) via the communications interface 812, on-aircraft gateway 602, and/or cloud-based infrastructure 604.

Referring now to FIG. 10B, in some embodiments the PHM analyzer 802 may be implemented as a function or module configured for execution on, or integrated as a component of, another aircraft system 606 (e.g., an aircraft interface device (AID), flight data concentrator (FDC), or any other appropriate aircraft system), similarly to the implementation of the PHM coordinator as shown by FIG. 6B.

Figures 10C, 10D:
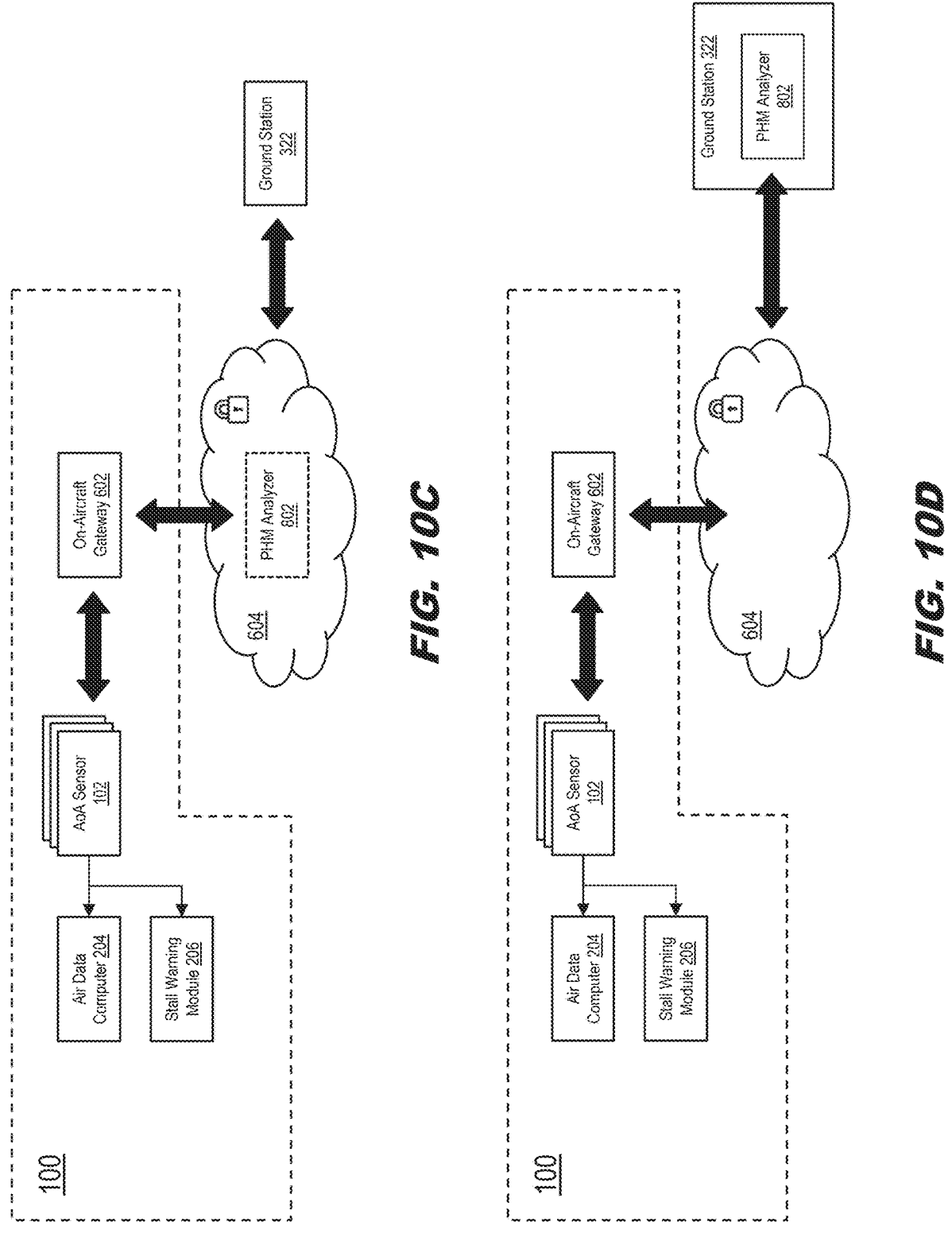
FIG. 10C is a block diagram illustrating the PHM analyzer of FIG. 8 implemented in a cloud-based infrastructure.
FIG. 10D is a block diagram illustrating the PHM analyzer of FIG. 8 implemented in a ground-based station remotely located from the aircraft.

In some embodiments, referring now to FIG. 10C, the PHM analyzer 802 may be implemented within the cloud-based infrastructure 604. For example, the cloud-based infrastructure 604 may provide for the reception of digital AoA data 708 and sensor health data 318 collected within each digital AoA sensor 700 (e.g., sampled and packetized via the PHM data concentrator (814, FIG. 8) implemented by the sensor's processing unit (702, FIG. 7)); implementation of data storage (806, FIG. 8) and configuration files (808, FIG. 8) for monitored digital AoA data and sensor health data; determination of current sensor responsiveness factor (RF) based on application of PHM algorithms to digital AoA data and sensor health data; identification or detection of fault conditions indicative of imminent sensor failure (or confirmation of nominal sensor operation, as appropriate); and forwarding of any alerts and/or status reports to preventative maintenance personnel via the ground control station 322.

In other embodiments, referring now to FIG. 10D, the PHM analyzer 802 may be implemented at a ground control station 322, remotely located from the aircraft 100. For example, the ground-based PHM analyzer 802 may: securely access digital AoA data 708 and sensor health data 318 sampled and packetized by the PHM data concentrators (814, FIG. 8) within each digital AoA sensor 700 from storage within the cloud-based infrastructure 604; determine current sensor responsiveness factors (RF) for each digital AoA sensor 700 based on application of PHM algorithms to digital AoA data and sensor health data; identify fault conditions indicative of imminent sensor failure and/or confirm nominal sensor operation; and forward any alerts and/or status reports to preventative maintenance personnel.

Figure 11:
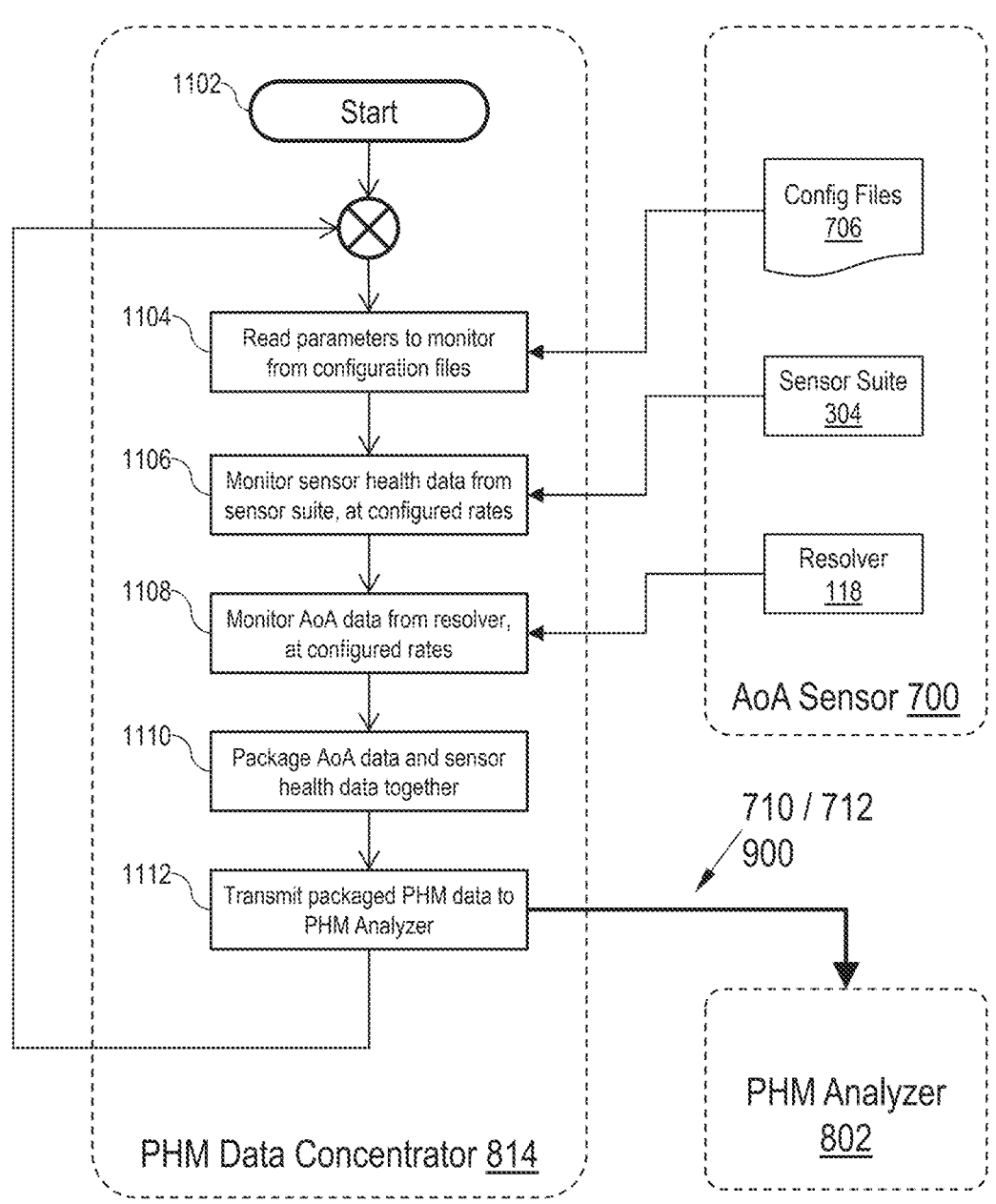
FIG. 11 is a flow diagram illustrating operational flows of the PHM data concentrator of FIG. 8.

Referring now to FIG. 11, an operational flow 1100 of the PHM data concentrator (814, FIG. 8) implemented within the processing unit (702, FIG. 7) of the digital AoA sensor (700, FIG. 8) is shown.

At a point 1102, the operational flow 1100 starts.

At a point 1104, the PHM data concentrator 814 reads monitoring parameters (e.g., sampling rates) from the configuration files 706 within the digital AoA sensor 700.

At a point 1106, the PHM data concentrator 814 samples sensor health data (318, FIG. 3) collected by the monitoring sensor suite (304, FIG. 8), e.g., at the sampling rate provided for by the configuration files 706.

At a point 1108, the PHM data concentrator 814 samples digital AoA data (708, FIG. 2) collected by the resolver (116, FIG. 7) and digitized by the processor (702, FIG. 7), e.g., at the sampling rate provided for by the configuration files 706.

At a point 1110, the PHM data concentrator 814 correlates the sampled digital AoA data 708 with concurrent sensor health data 318 into a PHM data package.

At a point 1112, the PHM data concentrator 814 transmits the PHM data package to the PHM analyzer 802 (e.g., via the communications interface 710/digital avionics bus 712 shown by FIG. 7, or the wireless communications interface 900 shown by FIG. 9). The PHM data concentrator 814 then restarts the operational flow 1100 at point 1102.

Figure 12:
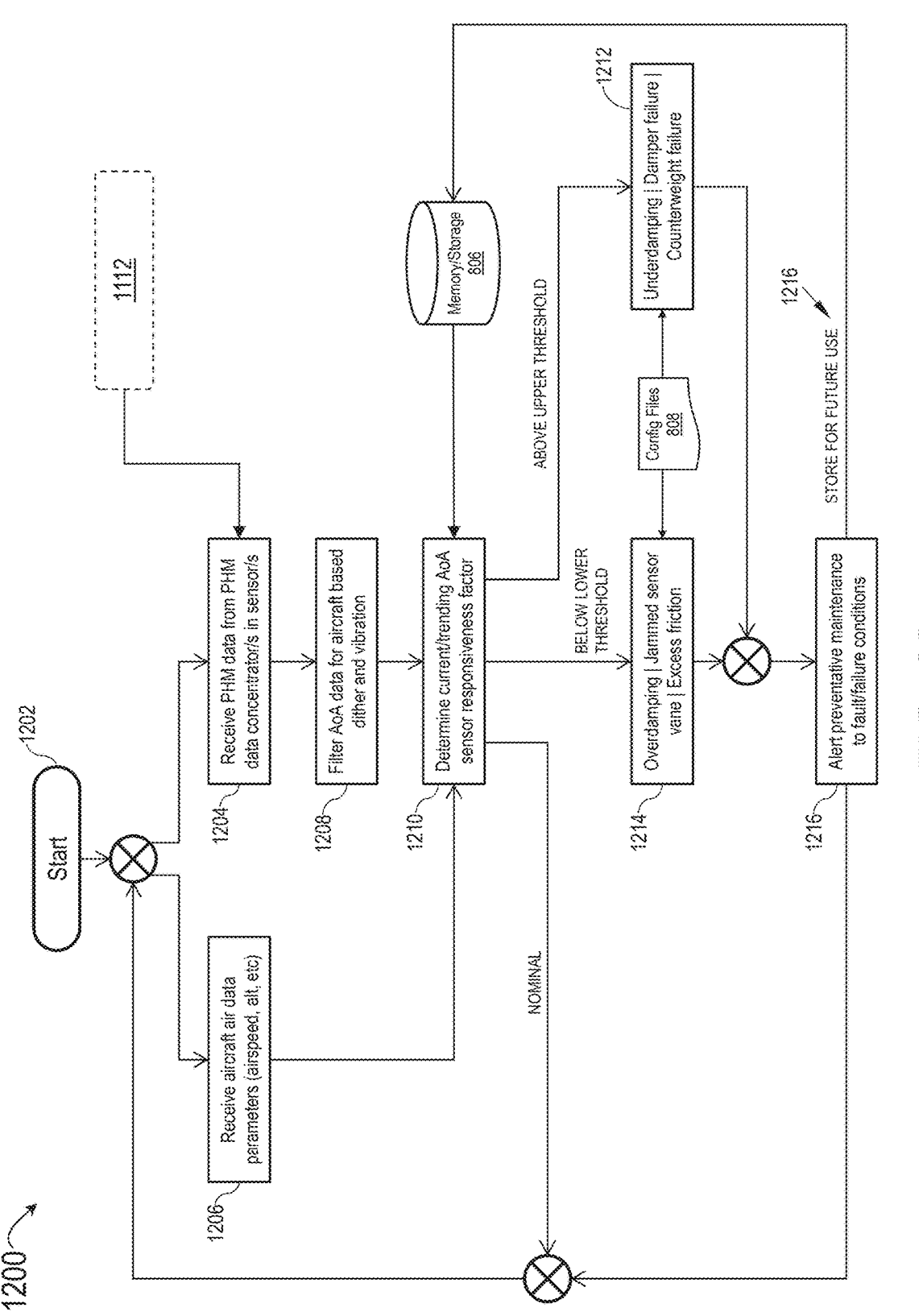
FIG. 12 is a flow diagram illustrating an operational flow of the PHM analyzer of FIG. 8.

Referring now to FIG. 12, an operational flow 1200 of the PHM analyzer (802, FIG. 8) is shown. In embodiments, the operational flow 1200 may additionally apply to the PHM coordinator (302, FIG. 3) with respect to the PHM system (300, FIG. 3; 800, FIG. 8) for prognostic health monitoring of analog or digital AoA sensors (102, FIG. 1; 700, FIG. 7). Broadly speaking, PHM analysis occurs in two stages and follows from the transmission of packaged PHM data (1112, FIG. 11) by the PHM data concentrator (814, FIG. 8) within each digital AoA sensor (700, FIG. 7), the packaged PHM data based on concurrent samples of analog or digital AoA data (202, FIG. 3; 708, FIG. 8) from the digital AoA sensor and sensor health data (318, FIG. 8) from the sensor suite (314, FIG. 8) within the digital AoA sensor.

For example, the first stage (e.g., sensor health monitoring) involves the reception of packaged AoA data by the PHM analyzer 802; removal of noise from the sampled raw AoA data 202, 708; and determining a current responsiveness factor (RF) for each digital or analog AoA sensor 700, 102 based on the sampled sensor health data 318 and AoA data. (It may be noted that the sensor health data 318 may previously undergo signal conditioning (324, FIG. 3) prior to sampling by the PHM data concentrator 814.)

The second stage (e.g., trend monitoring) places the current responsiveness factor in context with prior and historical responsiveness factor data for each digital or analog AoA sensor 700, 102 in order to determine a responsiveness trend specific to each sensor. Further, if the responsiveness factor for any digital or analog AoA sensor 700, 102 is trending beyond a responsiveness threshold, alerts of fault conditions or other responsive actions are triggered.

At a point 1202, the operational flow 1200 starts.

At a point 1204 (and following from the point 1112, wherein PHM data is transmitted by the PHM data concentrator 814), the PHM analyzer 802 receives PHM data (e.g., a concurrent package of sampled digital AoA data 708 collected by the (each) digital AoA sensor 700 and sensor health data 318 collected by the (each) monitoring sensor suite 304.

At a point 1206, the PHM analyzer 802 may also receive concurrent air data parameters (e.g., airspeed, altitude) of the embodying aircraft (100, FIG. 1), e.g., as collected and transmitted by the air data computer (204, FIG. 2).

At a point 1208, the PHM analyzer 802 filters and/or otherwise processes the PHM data package, e.g., to remove noise, dither and/or vibration from the digital AoA data 708 (and/or analog AoA data (202, FIG. 2)) by canceling out vibrations associated with the aircraft 100 based on the received air data parameters. In some embodiments, signal conditioning (324, FIG. 3) of sensor health data 318 may be performed by the PHM analyzer 802, instead of the signal conditioning circuits within each analog or digital AoA sensor 102, 700.

At a point 1210, the PHM analyzer 802 applies PHM analysis algorithms (310, FIG. 3) to the digital or analog AoA data 708, 202 and the sensor health data 318 to 1) determine a current responsiveness factor specific to each digital or analog AoA sensor 700, 102 and 2) refer to prior and historical responsiveness factor data for each AoA sensor to establish a responsiveness trend over time for that AoA sensor. For example, when the responsiveness of a digital or analog AoA sensor 700, 102 is trending within responsiveness thresholds, the operational flow 1200 restarts. The PHM analyzer 802 may, in some embodiments, generate a status report to the effect that the digital or analog AoA sensor 700, 102 is operating nominally.

At a point 1212, when the responsiveness factor for a given digital or analog AoA sensor 700, 102 is trending above an upper PHM threshold, the PHM analyzer 802 generates an alert of a fault condition in the AoA sensor indicative of: an underdamping of the AoA sensor; a failure of the damper elements (114, FIGS. 1 and 7); and/or a failure of the counterweight (108, FIGS. 1 and 7). For example, an alert may be generated every time the responsiveness factor trends above the upper threshold, or only when the responsiveness factor remains above the upper threshold for at least a threshold duration, as provided for by the configuration files 808 within the PHM analyzer 802.

At a point 1214, when the responsiveness factor for a given digital or analog AoA sensor 700, 102 is trending below a lower PHM threshold, the PHM analyzer 802 generates an alert of a fault condition in the AoA sensor indicative of: overdamping of the AoA sensor; jamming of the probe (104, FIGS. 1 and 7) due to, e.g., deformation, damage, or icing; and/or excessive friction within the AoA sensor impeding rotational movement of the probe and shaft (106, FIGS. 1 and 7). As above, an alert may be generated every time the responsiveness factor trends below the lower threshold, or only when the responsiveness factor remains below the lower threshold for at least a threshold duration, as provided for by the configuration files 808 within the PHM analyzer 802. In some embodiments, responsiveness trending below the lower threshold may be indicative not only of icing within the probe 104 and/or sensor 102, 700, but of a degradation or failure of heating units configured to prevent ice formation by heating the probe and sensor components. As noted above, the PHM analyzer 802, similarly to the PHM coordinator 302 shown by FIG. 3, may likewise determine a heater health factor and trending heater health, generating an alert indicative of heater failure when the heater health trends beyond a threshold level.

At a point 1216, the PHM analyzer 802 reports any generated alerts and/or nominal status reports with respect to the digital or analog AoA sensors 700, 102 to preventive maintenance personnel on the ground. Further, at a point 1218, the PHM analyzer stores the current responsiveness factor data (e.g., along with any related alerts and/or status reports) to historical sensor data in memory or data storage (e.g., memory 806, 312 within the PHM analyzer 802/PHM coordinator 302; memory 704 within the digital AoA sensor 700).

Figure 13:
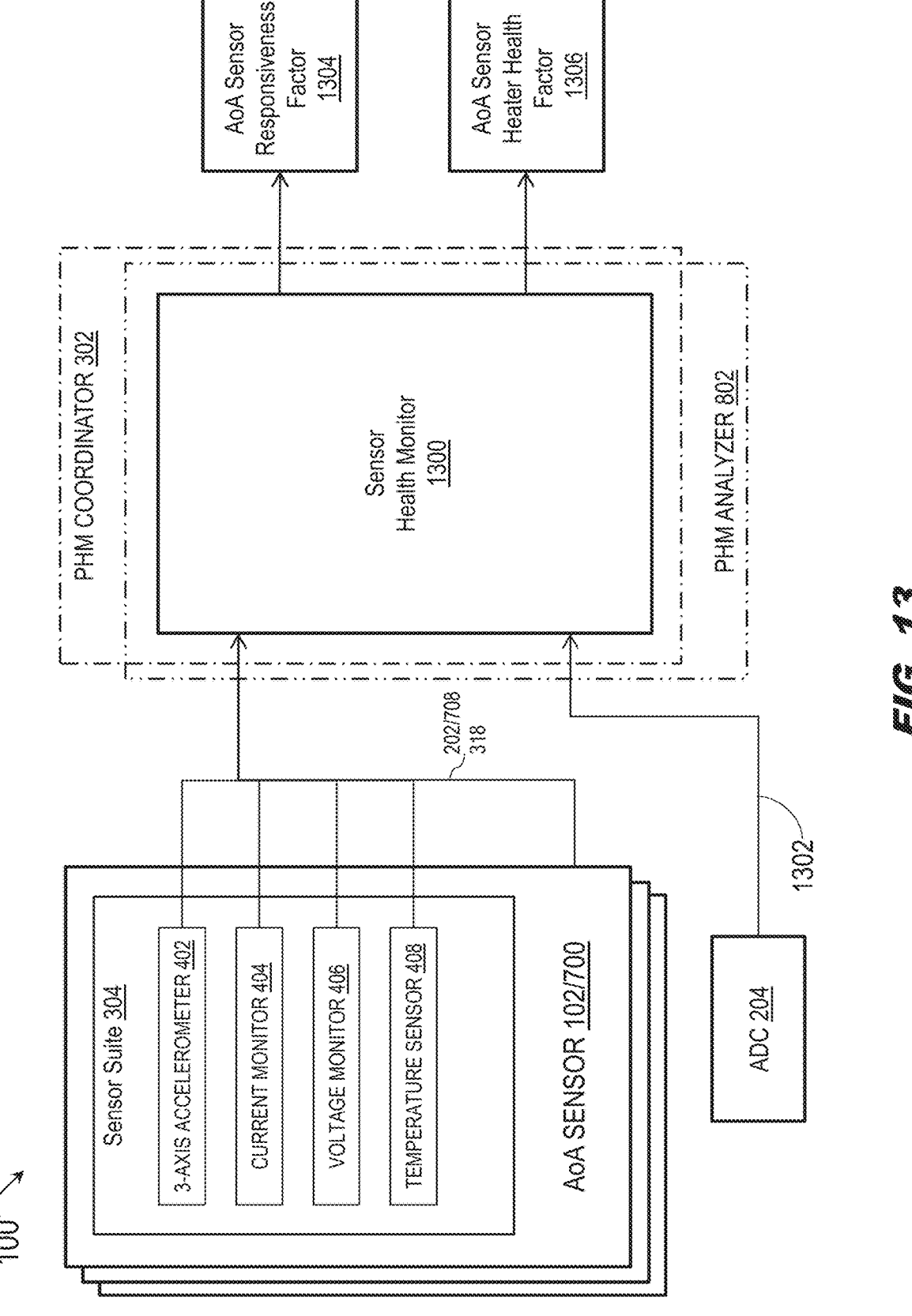
FIG. 13 is a block diagram illustrating sensor health monitoring operations of the analog and digital PHM systems of FIG. 3 and FIG. 8.

Referring now to FIG. 13, the aircraft 100 is shown.

In embodiments, and as noted above, prognostic health monitoring (PHM) analysis via the PHM system 300 shown by FIG. 3 (e.g., for monitoring of analog angle of attack (AoA) sensors (102, FIG. 1)) and the PHM system 800 shown by FIG. 8 (e.g., for monitoring of digital AoA sensors (700, FIG. 7)) generally comprises two phases: sensor health monitoring and trend monitoring. For example, the sensor health monitor 1300 (e.g., the PHM coordinator (302, FIG. 3) or PHM analyzer (802, FIG. 8)) may receive angle of attack (AoA) data from one or more AoA sensors (e.g., analog AoA data (202, FIG. 3) from analog AoA sensors 102; digital AoA data (708, FIG. 8) from digital AoA sensors 700).

Concurrently with the analog or digital AoA data 202, 708, the sensor health monitor 1300 may receive sensor health data 318 collected by the monitoring sensor suite 304 within each analog or digital AoA sensor 102, 700 (e.g., accelerometer 402, current monitor 404, voltage monitor 406, temperature sensor 408). For example, the sensor health data 318 may also be processed via signal conditioning circuits (324, FIG. 3) within the analog or digital AoA sensors 102, 700 to filter or otherwise remove noise or inconsistencies from the sensor health signals. Similarly, as noted above, the sensor health monitor 1300 may receive digital AoA sensor data 708 and sensor health data 318 concurrently sampled by a PHM data concentrator (814, FIG. 8) within each digital AoA sensor 700 and packetized for transmission to the PHM analyzer. Further, the sensor health monitor 1300 may receive airspeed, altitude, and other air data parameters 1302 of the aircraft 100 (e.g., from the air data computer (204, FIG. 2)).

In embodiments, the sensor health monitor 1300 may process the received analog or digital AoA data 202, 708 to filter or remove noise due to aircraft vibration and/or dither. For example, the sensor health monitor 1300 may compensate for aircraft vibration as measured by the accelerometer 402, and may remove dither via digital filtering.

In embodiments, the sensor health monitor 1300 may apply PHM algorithms by convoluting the processed analog or digital AoA data 202, 708 with the concurrent sensor health data 318 and air data parameters 1302 to determine a current responsiveness factor 1304 (RF) indicative of nominal or degraded operation (the latter indicative of, e.g., imminent failure or fault) of the analog or digital AoA sensor 102, 700.

In some embodiments, the sensor health monitor 1300 may further determine a heater health factor 1306 (HHF) based on sensor health data 318. For example, as noted above, certain types of trending sensor responsiveness may be indicative of a jammed AoA sensor probe 104, which may be due to ice formation or to other factors, e.g., damage to or deformation of the probe. In embodiments, by applying heater health analysis algorithms to and/or convolution of the sensor health data 318, e.g., voltage data sensed by the voltage sensor 406, current data sensed by the current sensor 404, and/or temperature data sensed by the temperature sensor 408, the sensor health monitor 1300 may likewise determine a heater health factor 1306 of the AoA sensor, both currently and over time (e.g., when correlated with historical heater health data). In embodiments, trending of the HHF 1306 may, similarly to the RF 1304, provide an indication of normal or degraded operation of the heating elements within a given analog or digital AoA sensor 102, 700. Similarly to AoA sensor responsiveness, heater health trending above or below a threshold level may trigger generation of an alert indicative of a fault or failure in the heating elements and/or heating system. For example, analog or digital AoA sensors 102, 700 may utilize positive temperature coefficient (PTC) heating elements assembled into a heater pack built into the AoA sensor. In embodiments, while degradation or failure of PTC heating elements or heater packs may be difficult to observe (e.g., when multiple heater packs are integrated into a parallel circuit, a failing element or pack may be difficult to identify), determination and observation of heater health factors 1306 can detect or predict degradation or failure of a heater pack within a specific analog or digital AoA sensor 102, 700. For example, consistently below average temperature readings and/or voltage reading within an AoA sensor 102, 700 may be indicative of heater degradation.

In embodiments, when the sensor health monitor 1300 has determined a current responsiveness factor 1304 for a given analog or digital AoA sensor 102, 700, the second phase of PHM analysis provides for correlation of the current RF with prior and historical RF data (e.g., as stored to memory (312, FIG. 3; 806, FIG. 8)) for that AoA sensor. For example, the PHM coordinator 302/PHM analyzer 802 may determine a responsiveness trend of the analog or digital AoA sensor 102, 700 over time by combining the current RF 1304 with prior and historical RF data.

Referring also to FIGS. 14A through 14D, the relationship 1400 of the responsiveness factor 1304 (RF) of a given analog or digital AoA sensor 102, 700 over time may include an upper responsiveness threshold 1402 (e.g., indicative of a high responsiveness factor) and a lower responsiveness threshold 1404 (e.g., indicative of a low responsiveness factor), both thresholds determined by the configuration files (314, FIGS. 3 and 808, FIG. 8). Over time (e.g., as the analog or digital AoA sensor 102, 700 accumulates operational hours), the RF 1304 for a given analog or digital AoA sensor 102, 700 may deviate in one direction or the other from nominal responsiveness 1406 (e.g., normal, accurate operation of the AoA sensor).

Figure 14A:
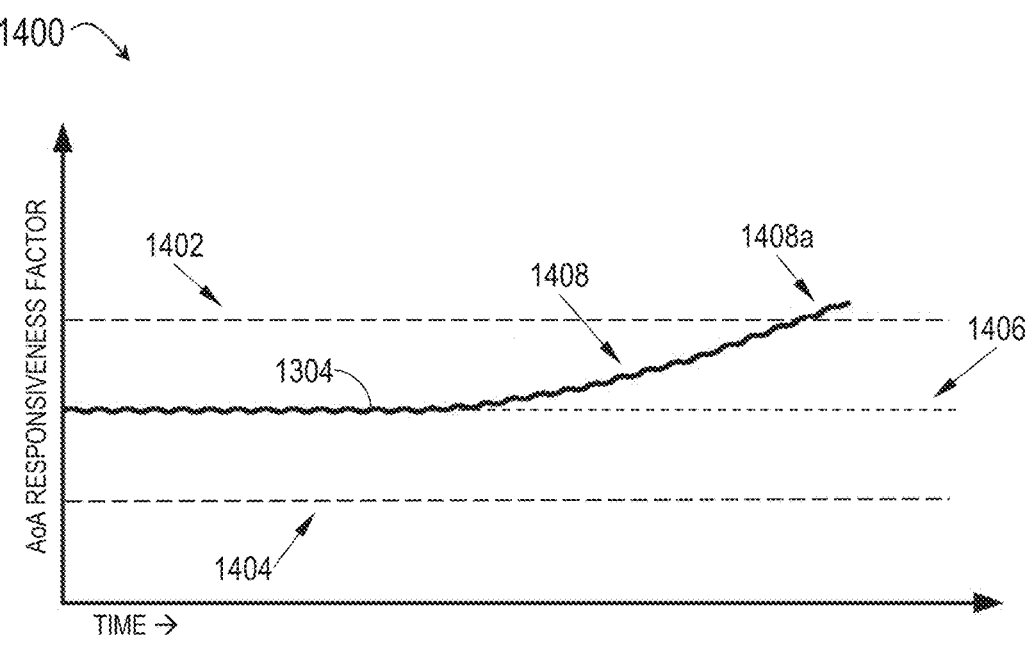
FIGS. 14A and 14B are graphical illustration of monitoring by the PHM coordinator of FIG. 3 and the PHM analyzer of FIG. 8 of a responsiveness factor (RF) of the analog or digital AoA sensors of FIG. 1 or FIG. 7 trending above or below RF thresholds.

In embodiments, referring in particular to FIG. 14A, certain specific factors may cause the RF 1304 to trend upward 1408, such as underdamping or failure of the damper elements (114, FIGS. 1 and 7) or failure of the counterweight (108, FIGS. 1 and 7). In embodiments, when an upward deviation 1408 of the RF 1304 continues (1408a) to the extent that the RF exceeds the upper responsiveness threshold 1402 (e.g., momentarily, for at least a threshold duration defined by the configuration files 314, 808), the PHM coordinator 302/PHM analyzer 802 may generate a positive (e.g., upper) deviation alert indicative of a positive fault condition within the analog or digital AoA sensor 102, 700. For example, a positive deviation alert may indicate to preventive maintenance personnel on the ground (e.g., at the designation airport per the current flight plan of the aircraft 100) potential or imminent failure of the analog or digital AoA sensor 102, 700 due to one or more specific causes associated with the positive deviation alert, e.g., underdamping, damper failure, counterweight failure.

Figure 14B:
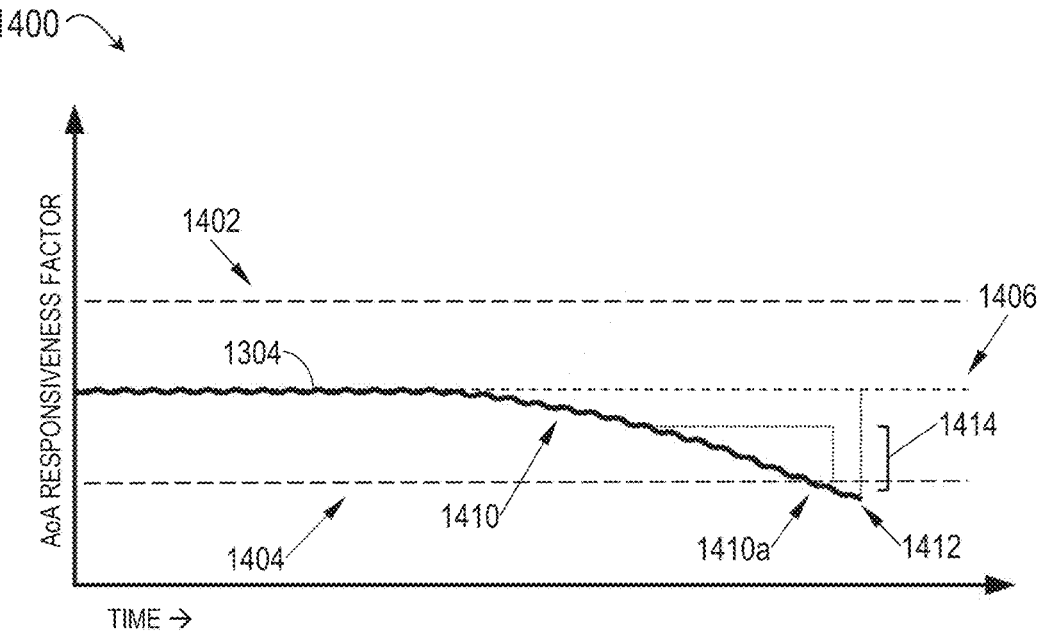

Referring in particular to FIG. 14B, other specific factors may cause the RF 1304 to trend downward 1410, such as overdamping of the damper elements 114 or jamming (which may include physical damage and/or deformation) of the probe (104, FIGS. 1 and 7) due to bird strikes, airborne debris, excessive friction, and/or ice formation. In embodiments, when a downward deviation 1410 of the RF 1304 subceeds or otherwise breaches (1410a) the lower responsiveness threshold 1404 (e.g., for at least the threshold duration), the PHM coordinator 302/PHM analyzer 802 may generate a negative (e.g., lower) deviation alert indicative of a negative fault condition within the analog or digital AoA sensor 102, 700. For example, a negative deviation alert may indicate to preventive maintenance personnel on the ground (e.g., at the designation airport per the current flight plan of the aircraft 100) potential or imminent failure of the analog or digital AoA sensor 102, 700 due to one or more specific causes associated with the negative deviation alert, e.g., overdamping, excessive friction, probe damage, probe deformation, probe jamming, heater degradation, heater failure. In some embodiments, deviation alerts, whether negative or positive, may further include a magnitude 1412 of the current RF 1304 and/or a rate of change 1414 (e.g., slope) of the trending RF.

Figure 14C:
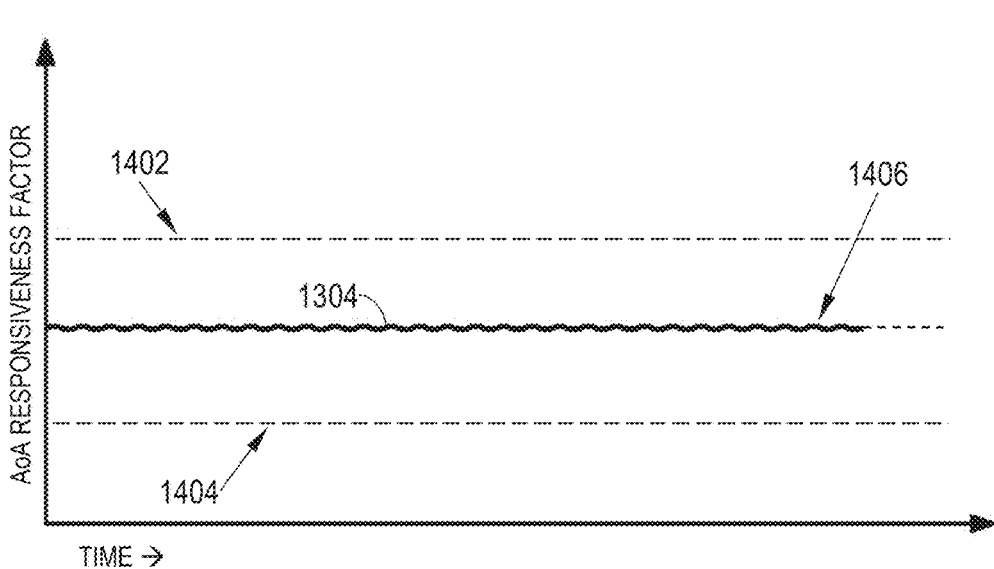
FIG. 14C is a graphical illustration of monitoring by the PHM coordinator of FIG. 3 and the PHM analyzer of FIG. 8 of a responsiveness factor (RF) of the analog or digital AoA sensors of FIG. 1 or FIG. 7 trending nominally within RF thresholds.

Referring in particular to FIG. 14C, the RF 1304 of the analog or digital AoA sensor 102, 700 may consistently trend between the positive and negative responsiveness thresholds 1402, 1404 and may even fail to deviate significantly from nominal responsiveness 1406 (e.g., newly installed AoA sensors). Accordingly, when the PHM coordinator 302/PHM analyzer 802 determines that the RF 1304 for a given analog or digital AoA sensor 102, 700 is trending within nominal responsiveness 1406 or between the upper and lower responsiveness thresholds 1402, 1404, the PHM coordinator 302/PHM analyzer 802 may generate a status report indicating nominal operations of the AoA sensor (e.g., if provided for by configuration files 314, 808). In embodiments, any current RF 1304 (along with any positive or negative alerts and/or status reports resulting from a current RF trend) may be stored to memory 312, 806 with other prior and historical RF data for the analog or digital AoA sensor 102, 700 for use in future RF trending analysis and/or maintenance logging.

Figure 14D:
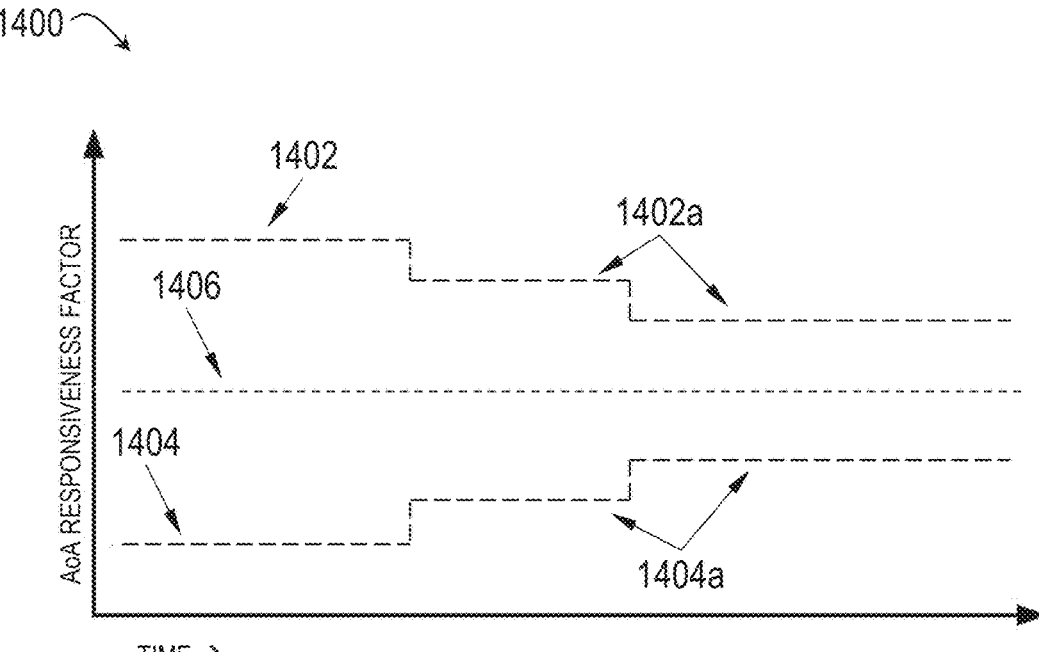
FIG. 14D is a graphical illustration of monitoring by the PHM coordinator of FIG. 3 and the PHM analyzer of FIG. 8 of a dynamic RF threshold based on the operational life of the analog or digital AoA sensors of FIG. 1 or FIG. 7.

Referring in particular to FIG. 14D, upper and lower responsiveness thresholds 1402, 1404, as well as nominal responsiveness 1406, may be determined by configuration files 314, 808 of the PHM coordinator 302/PHM analyzer 802. In embodiments, upper and lower responsiveness thresholds 1402, 1404 for a given analog or digital AoA sensor 102, 700 may be dynamic across one or more dimensions. For example, across the operational life of a given analog or digital AoA sensor 102, 700, the upper and lower responsiveness thresholds 1402, 1404 may narrow (1402a, 1404a) over time, e.g., to reflect normal wear and tear on the components of the AoA sensor and the increasing likelihood of imminent failure as the AoA sensor approaches the end of its expected lifecycle.

In some embodiments, the configuration files 314, 808 may provide for dynamic adjustments of the upper and/or lower responsiveness thresholds 1402, 1404 based on other factors. For example, within the current flight plan of the aircraft 100, the upper and lower responsiveness thresholds 1402, 1404 may be adjusted according to the current flight segment (e.g., takeoff, climb, cruise, descent, landing).

Figure 15:
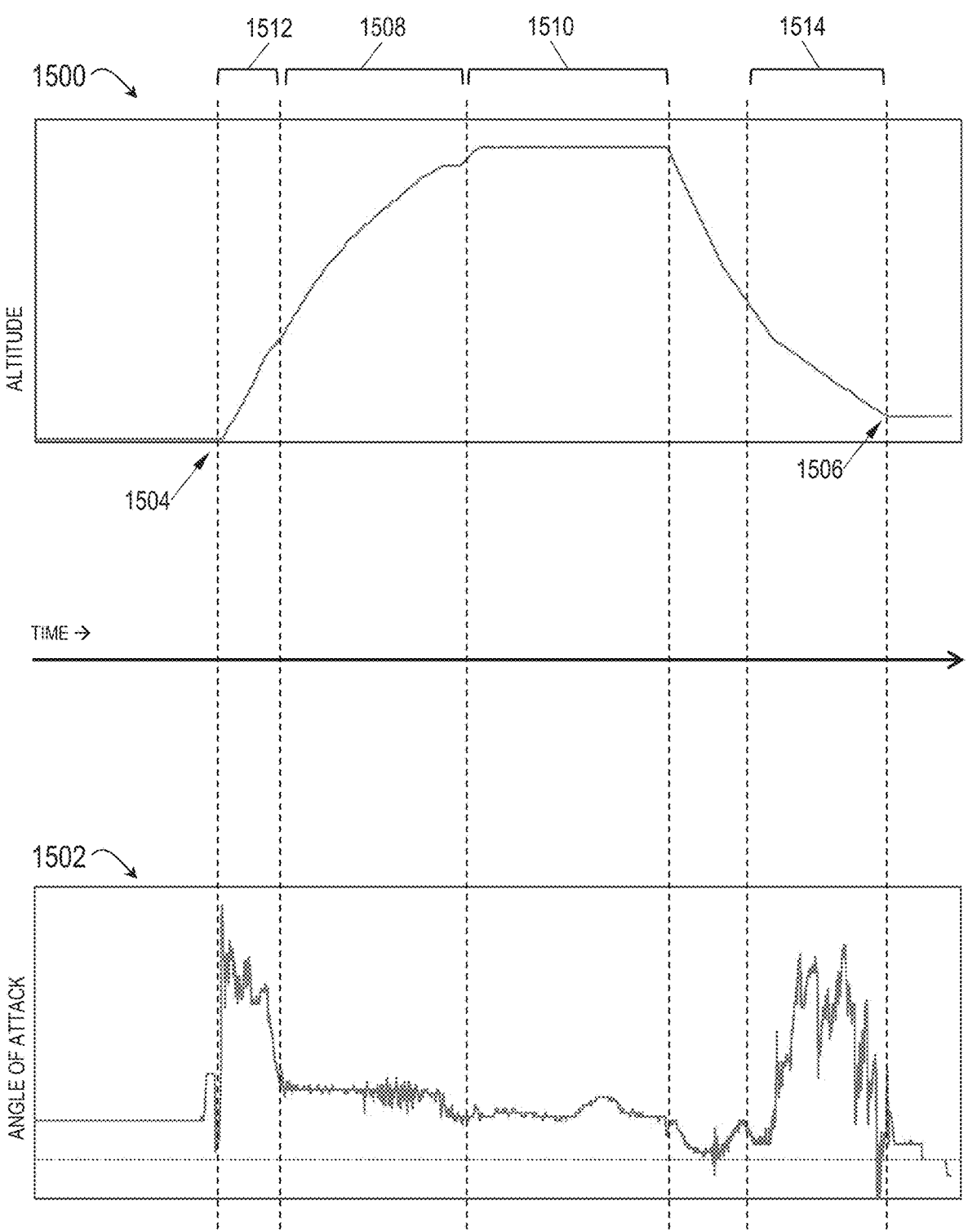
FIG. 15 is a graphical illustration of the relationship between angle of attack (AoA) variance throughout various phases or segments of a complete flight plan with respect to AoA sensor responsiveness thresholds of the analog and digital PHM systems of FIG. 3 and FIG. 8.

For example, referring also to FIG. 15, the graphs 1500 and 1502 may respectively plot altitude and angle of attack settings for the aircraft 100 throughout the execution of its flight path, e.g., from initial taxi and takeoff 1504 from the origin airport to touchdown 1506 at the destination airport. It may be observed that throughout the flight, angle of attack settings may remain relatively consistent through some flight segments (e.g., final climb 1508, cruise 1510) but may vary widely during other flight segments (e.g., initial climb 1512, final descent/approach 1514. Accordingly, in embodiments, the upper and lower responsiveness thresholds 1402, 1404 for AoA sensors 102, 700 may be adjusted (e.g., per configuration files 314, 808) to allow for greater or lesser variance in likely reported AoA values.

In embodiments, dynamic adjustments of responsiveness thresholds based on the current flight segment may reflect the increased likelihood of particular conditions that may contribute to a fault condition during a particular flight segment (e.g., increased possibility of bird strikes or debris during takeoffs and landings, increased likelihood of ice formation at sustained high-altitude cruise).

Referring now to FIG. 16A, the method 1600 may be implemented by the PHM systems 300, 800 and may include the following steps.

At a step 1602, a prognostic health monitor (PHM) samples angle of attack (AoA) data collected by an aircraft-based AoA sensor. For example, a PHM data coordinator may receive analog AoA data from one or more analog AoA sensors, or a PHM data concentrator within a digital AoA sensor may receive digital AoA data from that sensor. In some embodiments, the PHM (e.g., the PHM data coordinator, or a PHM analyzer receiving raw sampled data from the data concentrator) pre-processes the sampled AoA data (e.g., to remove noise associated with aircraft-based vibration and/or dither). In some embodiments, the PHM data coordinator or analyzer may be implemented as a standalone line replaceable unit (LRU) or integrated as a component (e.g., executable function/s or module/s) of another aircraft system. In some embodiments, the PHM data coordinator or analyzer may be implemented in a cloud-based architecture or at a ground control station remotely located from the aircraft.

At a step 1604, the PHM samples concurrent AoA sensor health data collected by a suite of monitoring sensors within each AoA sensor. For example, monitoring sensor suites may include at least a three-axis accelerometer, current sensor, voltage sensor, and temperature sensor. In some embodiments, the PHM data coordinator may receive from each of one or more analog AoA sensors sensor health data from the sensor suite in that sensor, as well as concurrent analog AoA data sensed by that sensor. In some embodiments, digital AoA data and concurrent sensor health data may be correlated and packetized by the PHM data concentrator for transmission to the PHM data analyzer. In some embodiments, monitoring sensor signals are filtered and/or processed by signal conditioning circuitry within the AoA sensor.

At a step 1606, the PHM, based on sampled AoA data and sensor health data, determines a current responsiveness factor indicative of the current operating health of the AoA sensor.

At a step 1608, the PHM retrieves from memory or data storage prior or historical responsiveness factor data for the AoA sensor.

At a step 1610, the PHM determines a responsiveness trend of AoA sensor operations over time, based on the current responsiveness factor and historical responsiveness factor data.

At a step 1612, when the responsiveness factor of an AoA sensor trends beyond a responsiveness threshold, the PHM generates an alert of a fault condition indicative of potential or imminent failure of the AoA sensor. For example, when the responsiveness factor trends above an upper responsiveness threshold, the PHM generates an alert based on potential underdamping, damper failure, counterweight failure, or other fault conditions within the AoA sensor associated with deviantly excessive responsiveness. Alternatively, when the responsiveness factor trends below a lower responsiveness threshold, the PHM generates an alert based on potential overdamping, sensor probe damage or deformation, sensor probe jamming due to debris or ice formation heater degradation or failure, or other fault conditions within the AoA sensor associated with deviantly low responsiveness. In some embodiments, alert thresholds are based on deviation beyond the upper or lower responsiveness threshold either momentarily or for at least a threshold duration. In some embodiments, upper or lower responsiveness thresholds may be dynamic, e.g., raised or lowered depending on sensor-specific characteristics (e.g., responsiveness thresholds may narrow with advancing operational age of the AoA sensor) or other characteristics (e.g., responsiveness thresholds may vary based on the current flight segment). In some embodiments, alerts may additionally include a magnitude of the current responsiveness factor and/or a rate of change (e.g., slope) of the responsiveness trend.

Figure 16B:
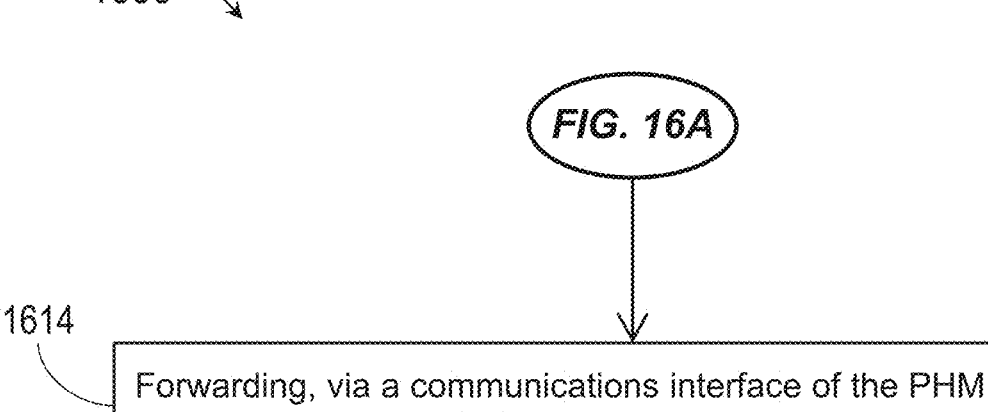

Referring now to FIG. 16B, the method 1600 may include an additional step 1614. At the step 1614, the PHM forwards the generated responsiveness alert or status report to a ground control station for further processing (e.g., and for forwarding to preventative maintenance personnel at the destination airport or elsewhere on the ground).

Figure 16C:
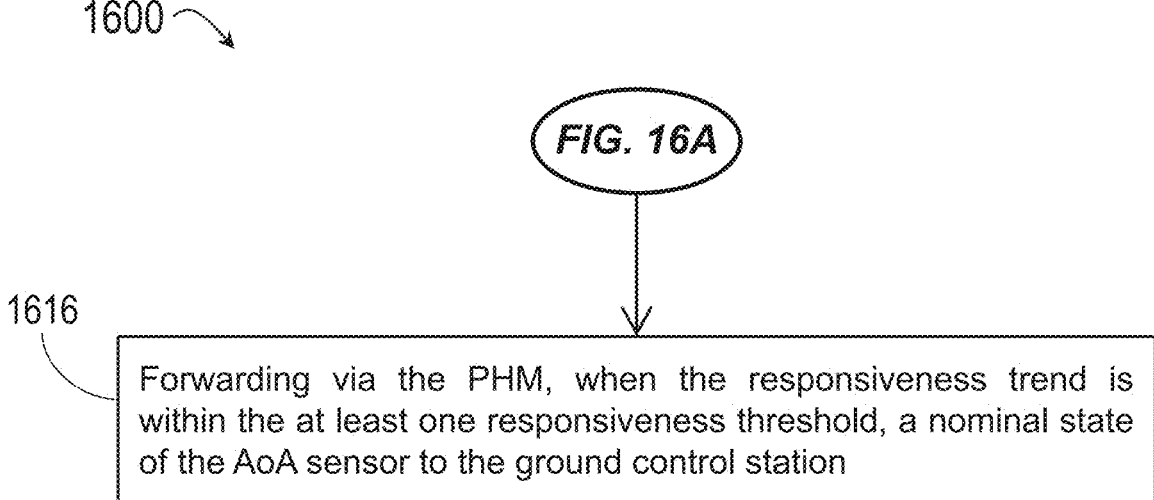

Referring now to FIG. 16C, the method 1600 may include an additional step 1616. At the step 1616, when AoA sensor responsiveness is trending between upper and lower responsiveness thresholds (e.g., indicative of nominal sensor operation), the PHM generates a report of the nominal status of the associated AoA sensor for transmission to preventative maintenance personnel and/or ground control.

Referring now to FIG. 16D, the method 1600 may include an additional step 1618. At the step 1618, the PHM stores the current (e.g., most recent) responsiveness factor with historical responsiveness factor data for that AoA sensor to memory or other like data storage (e.g., within the PHM).

Referring now to FIG. 16E, the method 1600 may include additional steps 1620 through 1624. At the step 1620, based on the sensor health data received from the sensor suite within a given analog or digital AoA sensor, the PHM determines a heater health factor (HHF) indicative of normal or abnormal operations of heating elements and/or systems (e.g., PTC heater packs) within an AoA sensor. For example, the HHF may be based on temperature, voltage, and/or current data collected by the monitoring sensor suite within the AoA sensor.

At a step 1622, similarly to the sensor responsiveness trend, the PHM references prior heater health factor data to determine a heater health trend over time with respect to the heating element and/or heating system.

At the step 1624, if the HHF trend deviates beyond a heater health threshold, the PHM generates an alert indicative of a fault condition indicative of heater element/heater system degradation and/or failure within the AoA sensor.

Referring now to FIG. 16F, the method 1600 may include an additional step 1626. At the step 1626, the PHM receives air data parameters (e.g., aircraft altitude, aircraft airspeed) from an aircraft-based air data computer. For example, determination by the PHM of a current responsiveness factor of an analog or digital AoA sensor may additionally account for vibration of the aircraft or other aircraft-based factors by incorporating the received air data parameters.

BENEFITS OF THE INVENTION

Embodiments of the inventive concepts disclosed herein allow for localized prediction of imminent failure of specific AoA sensors without the need for external systems to diagnose faults and/or failures. Predictive and reliable identification of fault conditions indicative of imminent failure allows airlines to proactively plan maintenance at an appropriate time rather than reacting to a critical failure, reducing inventory and minimizing operational disruption. Further, PHM analysis can provide detail and background as to why a fault condition may exist with respect to a particular AoA sensor. Further still, PHM functionality allows for detection of degraded heater performance in specific AoA sensors, as is now required by the FAA, EASA, and other regulatory authorities.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A prognostic health monitoring (PHM) system for aircraft-based analog angle of attack (AoA) sensors, the system comprising:

at least one prognostic health monitoring (PHM) coordinator, the PHM coordinator including:

at least one first communications interface configured for connecting the PHM coordinator to at least one of an aircraft-based analog AoA sensor, and an aircraft-based monitoring sensor;

a memory configured for storage of historical data including at least one prior responsiveness factor (RF) associated with each analog AoA sensor, wherein the at least one prior RF is associated with each analog AoA sensor with respect to a current flight, specific segments of the current flight, and an operational life of the AoA sensor;

at least one second communications interface configured for connecting the PHM coordinator to a ground control station;

and at least one processor configured in real time during the current flight to:

sample analog AoA data sensed by each analog AoA sensor;

sample sensor health data sensed by the at least one monitoring sensor;

determine, based on the analog AoA data and the sensor health data, a current responsiveness factor (RF) associated with each analog AoA sensor;

determine, based on the current RF and at least one prior RF associated with each analog AoA sensor, a responsiveness trend associated with the analog AoA sensor;

when the responsiveness trend deviates beyond at least one responsiveness threshold, generate an alert indicative of a fault condition associated with the analog AoA sensor, wherein a type of the alert is based on a nature of a deviation of the responsiveness trend; and forward the alert to the ground control station via the at least one second communications interface.

2. The PHM system of claim 1, wherein:

the analog AoA sensor is a first analog AoA sensor of a plurality of analog AoA sensors; and wherein the alert identifies the first analog AoA sensor associated with the fault condition among the plurality of analog AoA sensors.

3. The PHM system of claim 1, wherein:

the memory is configured for storage of one or more configuration files; and wherein the at least one processor is configured to sample one or more of the analog AoA data or the sensor health data at a sampling rate defined by the one or more configuration files.

4. The PHM system of claim 1, wherein, when the responsiveness trend is within the at least one responsiveness threshold, the at least one processor is configured to forward a nominal state of the associated analog AoA sensor to the ground control station.

5. The PHM system of claim 1, wherein the at least one processor is configured to generate the alert when the responsiveness trend deviates beyond the at least one responsiveness threshold for at least a threshold duration.

6. The PHM system of claim 1, wherein, when the responsiveness trend deviates above an upper responsiveness threshold, the fault condition is selected from a group including an underdamping fault, a counterweight fault, and a damping failure associated with the analog AoA sensor.

7. The PHM system of claim 1, wherein, when the responsiveness trend deviates below a lower responsiveness threshold, the fault condition is selected from a group including an overdamping fault and a jammed probe associated with the analog AoA sensor.

8. The PHM system of claim 7, wherein the fault condition is associated with a heating unit of the analog AoA sensor.

9. The PHM system of claim 1, wherein:

the analog AoA sensor includes at least one heating unit; and wherein the at least one processor is configured to:

determine, based on the sensor health data, a current heater health factor (HHF) associated with the at least one heating unit;

determine, based on the current HHF and at least one prior HHF associated with the analog AoA sensor, a heater health trend associated with the at least one heating unit; and when the heater health trend deviates beyond at least one heater health threshold, generating an alert indicative of a fault condition associated with the at least one heating unit.

10. The PHM system of claim 1, wherein the at least one processor is configured to store each current RF to the historical data associated with the analog AoA sensor.

11. The PHM system of claim 1, wherein the at least one monitoring sensor includes one or more of:

an accelerometer;

a voltage sensor;

a current sensor;

or a temperature sensor.

12. The PHM system of claim 1, wherein the PHM coordinator is embodied in an aircraft-based line replaceable unit (LRU).

13. The PHM system of claim 1, wherein the PHM coordinator is integrated as at least one of a function or a module configured for execution by an aircraft-based avionics system.

14. The PHM system of claim 1, further comprising:

a sensor suite disposed within each analog AoA sensor, each sensor suite including the at least one monitoring sensor; and at least one signal conditioning circuit configured to:

receive the sensor health data from the at least one monitoring sensor;

process the sensor health data to remove at least one of noise, dither, vibration, or inconsistency; and provide the processed sensor health data to the PHM coordinator via the at least one first communications interface.

15. The PHM system of claim 1, wherein the at least one processor is configured to process the analog AoA data to remove at least one of noise, dither, or vibration.

16. The PHM system of claim 1, wherein the at least one first communications interface includes at least one wireless interface.

17. The PHM system of claim 16, wherein the PHM coordinator is embodied in one of:

a cloud-based processing environment;

or a ground-based device.

18. The PHM system of claim 1, wherein:

the PHM coordinator is connected, via the at least one first communications interface, to at least one aircraft-based air data system; and wherein the at least one processor is configured to:

sample aircraft air data from the at least one air data system; and determine the current RF associated with each analog AoA sensor, based on the analog AoA data, the sensor health data, and the aircraft air data.

19. The PHM system of claim 1, wherein the alert includes one or more of:

a magnitude of the current responsiveness factor;

or a rate of change of the responsiveness trend.

* * * * *